United States Patent
An et al.

(10) Patent No.: US 9,055,259 B2
(45) Date of Patent: Jun. 9, 2015

(54) MULTIMEDIA DEVICE CONNECTED TO EXTERNAL ELECTRONIC DEVICE AND METHOD FOR CONTROLLING THE SAME

(71) Applicant: LG ELECTRONICS INC., Seoul (KR)

(72) Inventors: Obong An, Gyeonggi-do (KR); Geonwoo Kim, Gyeonggi-do (KR); Sang Hyun Cho, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 13/835,914

(22) Filed: Mar. 15, 2013

(65) Prior Publication Data

US 2014/0055675 A1 Feb. 27, 2014

(30) Foreign Application Priority Data

Aug. 23, 2012 (KR) .......................... 10-2012-0092446

(51) Int. Cl.
*H04N 7/173* (2011.01)
*H04N 5/445* (2011.01)
(Continued)

(52) U.S. Cl.
CPC ............ *H04N 5/44504* (2013.01); *G08C 17/02* (2013.01); *G08C 23/04* (2013.01); *H04N 5/4403* (2013.01); *H04N 21/42207* (2013.01); *H04N 21/42221* (2013.01); *H04N 21/42222* (2013.01); *H04N 21/42225* (2013.01); *H04N 21/42226* (2013.01); *H04N 21/4312* (2013.01); *H04N 21/44008* (2013.01); *H04N 21/8186* (2013.01);
(Continued)

(58) Field of Classification Search
CPC .................................................. H04N 7/17318
USPC ......................................... 725/133, 141, 153
See application file for complete search history.

(56) References Cited

U.S. PATENT DOCUMENTS

| 2011/0061078 A1* | 3/2011 | Rothschild ...................... 725/51 |
| 2012/0093415 A1 | 4/2012 | Robinson et al. |

(Continued)

FOREIGN PATENT DOCUMENTS

| EP | 1 983 496 | 10/2008 |
| EP | 2 109 313 | 10/2009 |

(Continued)

OTHER PUBLICATIONS

Korean Notice of Allowance dated Jan. 29, 2014, issued in Application No. 10-2012-0092446 (with English translation).

(Continued)

*Primary Examiner* — Hunter B Lonsberry
(74) *Attorney, Agent, or Firm* — KED & Associates LLP

(57) ABSTRACT

A method for controlling a remote controller and a multimedia device is disclosed. The multimedia device connected to an external electronic device includes a memory configured to store at least string and on screen display (OSD) graphic data corresponding thereto, a video processor configured to process a video image received from the external electronic device, a detection module configured to detect a string in the video image, a controller configured to access the memory and extract OSD graphic data corresponding to the detected string, a display module configured to output the extracted OSD graphic data, the OSD graphic data being divided into one or more regions, and a communication module configured to transmit a command signal corresponding to a specific region to the external electronic device or the remote controller if the specific region in the OSD graphic data is selected.

23 Claims, 43 Drawing Sheets

(51) Int. Cl.
*G08C 17/02* (2006.01)
*G08C 23/04* (2006.01)
*H04N 5/44* (2011.01)
*H04N 21/422* (2011.01)
*H04N 21/431* (2011.01)
*H04N 21/44* (2011.01)
*H04N 21/81* (2011.01)
*H04N 21/436* (2011.01)

(52) U.S. Cl.
CPC *H04N 2005/4407* (2013.01); *H04N 2005/4426* (2013.01); *H04N 2005/4428* (2013.01); *H04N 2005/4435* (2013.01); *H04N 21/43615* (2013.01)

(56) References Cited

U.S. PATENT DOCUMENTS

2012/0194429 A1    8/2012   Kwon et al.
2012/0201509 A1*   8/2012   Kamimaki et al. ........... 386/234

FOREIGN PATENT DOCUMENTS

| | | |
|---|---|---|
| JP | 2000-209520 | 7/2000 |
| JP | 2006-253858 | 9/2006 |
| JP | 5566428 | 8/2014 |
| KR | 10-2009-0009814 | 1/2009 |

OTHER PUBLICATIONS

Extended European Search Report for Application 13002427.6 dated Nov. 22, 2013.

* cited by examiner

FIG. 6

| TV function | Code value |
|---|---|
| Power | 0X08 |
| TV / external input | 0X0B |
| 1 | 0X11 |
| 2 | 0X12 |
| 3 | 0X13 |
| 4 | 0X14 |
| 5 | 0X15 |
| 6 | 0X16 |
| 7 | 0X17 |
| 8 | 0X18 |
| 9 | 0X19 |
| 0 | 0X10 |
| Sleep | 0X02 |
| Muting(Mate) | 0X09 |
| Channel △ | 0X00 |
| Channel ▽ | 0X01 |
| Volume △ | 0X03 |
| Volume ▽ | 0X02 |
| ⋮ | ⋮ |

FIG. 7

| Address | Kind of device | Function | Code value |
|---|---|---|---|
| Address 1 | STB | Function 1 | 0X01 |
| | | Function 2 | 0X02 |
| | | Function 3 | 0X03 |
| | | ⋮ | ⋮ |
| Address 2 | BD player | Function 4 | 0X51 |
| | | Function 5 | 0X52 |
| | | Function 6 | 0X53 |
| | | ⋮ | ⋮ |
| ⋮ | ⋮ | ⋮ | ⋮ |

FIG. 8
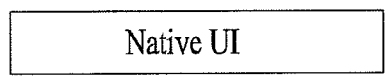
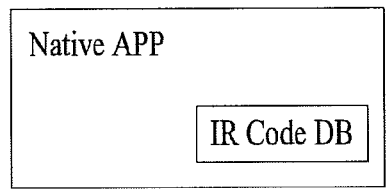
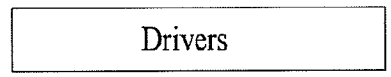
FIG. 9
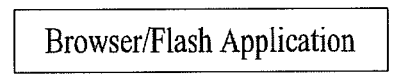
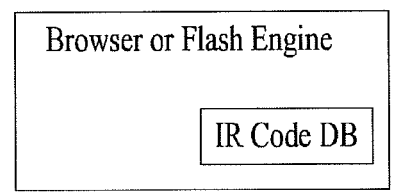
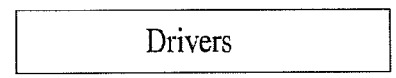

FIG. 14
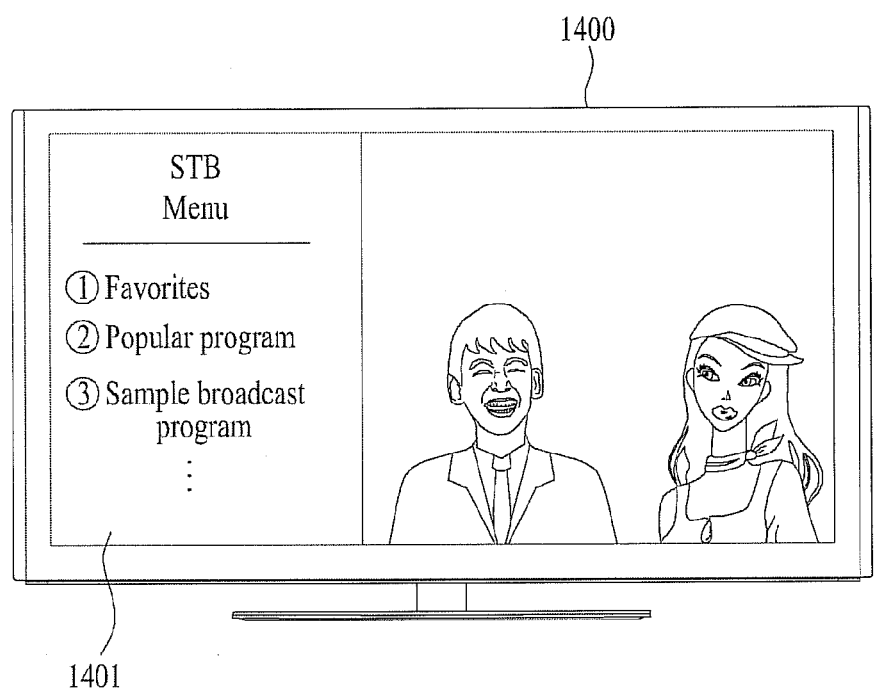
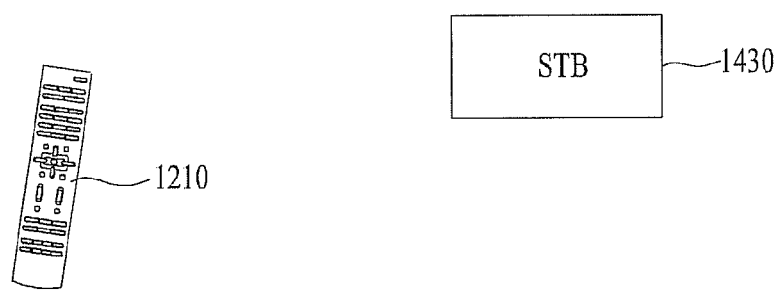

FIG. 37

| String | OSD |
|---|---|
| A | Type a |
| B | Type b |
| C | Type c |
| ⋮ | ⋮ |

FIG. 38

| String | OSD |
|---|---|
| Number | 1 2 3 / 4 5 6 / 7 8 9 / 0 |
| Color related string (ex: red, yellow, blue, ...) | ☐ ▨ ▤ ▥ |
| VOD | ◀ ■ ▶ ❙❙ |
| ⋮ | ⋮ |

MULTIMEDIA DEVICE CONNECTED TO EXTERNAL ELECTRONIC DEVICE AND METHOD FOR CONTROLLING THE SAME

CROSS-REFERENCE TO RELATED APPLICATION(S)

This application claims the benefit of Korean Patent Application No. 10-2012-0092446, filed on Aug. 23, 2012, which is hereby incorporated by reference as if fully set forth herein.

BACKGROUND

1. Field

The present invention relates to a multimedia device connected to an external electronic device and a method for controlling the same and, more particularly, to technology of controlling apparatuses of different communication protocols using one remote controller.

2. Background

With development of electronic technology, various kinds of electronic devices have been increasingly developed and popularized. The latest electronic devices have a function for receiving a remote controller signal for user convenience. As a result, it is possible for users to control various kinds of electronic devices, such as a television (TV), an audio player, a digital versatile disc (DVD) player, an air conditioner, and an electric fan, using remote controllers.

Meanwhile, a recently developed multimedia device (for example, a TV) has a function for receiving various kinds of information in a state in which the multimedia device is connected to a network, such as the Internet. In order to control the multimedia device and electronic devices, such as a set top box (STB), a Blu-ray disc (BD) player, a personal computer (PC), connected to the multimedia device, therefore, a number of remote controller corresponding to the number of the devices are required.

SUMMARY OF THE INVENTION

Accordingly, the present invention is directed to a multimedia device connected to an external electronic device and a method for controlling the same that substantially obviate one or more problems due to limitations and disadvantages of the related art.

According to one embodiment, a hybrid remote controller is provided that is capable of controlling different kinds of devices in two different communication protocols.

According to another embodiment, a method is provided to control different kinds of devices while reducing use of a memory of a remote controller.

According to another embodiment, an improved graphical user interface (GUI) is provided for a multimedia device communicating with the hybrid remote controller. For example, a solution associated with a multimedia device for automatically generating and displaying on screen display (OSD) graphic data satisfying a specific condition is provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a system for controlling an external electronic device includes storing at least one string and on screen display (OSD) graphic data corresponding thereto in a memory of a multimedia device, detecting a string in a video image output on a screen of the multimedia device, displaying OSD graphic data corresponding to the detected string on the screen, the OSD graphic data being divided into one or more regions, transmitting a code value corresponding to a specific region from the multimedia device to a remote controller using a first communication method if the specific region in the OSD graphic data is selected using the remote controller, and transmitting the code value from the remote controller to the external electronic device using a second communication method.

In another aspect of the present invention, a multimedia device connected to an external electronic device includes a memory configured to store at least string and on screen display (OSD) graphic data corresponding thereto, a video processor configured to process a video image received from the external electronic device, a detection module configured to detect a string in the video image, a controller configured to access the memory and extract OSD graphic data corresponding to the detected string, a display module configured to output the extracted OSD graphic data, the OSD graphic data being divided into one or more regions, and a communication module configured to transmit a command signal corresponding to a specific region to the external electronic device or the remote controller if the specific region in the OSD graphic data is selected.

In another aspect of the present invention, method for controlling a multimedia device connected to an external electronic device includes storing at least one string and on screen display (OSD) graphic data corresponding thereto in a memory, processing a video image received from the external electronic device, detecting a string in a video image, accessing the memory and extracting OSD graphic data corresponding to the detected string, synthesizing the extracted OSD graphic data and the video image and outputting the synthesized image, the OSD graphic data being divided into one or more regions, and transmitting a command signal corresponding to a specific region to an external unit if the specific region in the OSD graphic data is selected.

It is to be understood that both the foregoing general description and the following detailed description of the present invention are exemplary and explanatory and are intended to provide further explanation of the invention as claimed.

BRIEF DESCRIPTION OF THE DRAWINGS

The embodiments will be described in detail with reference to the following drawings in which like reference numerals refer to like elements wherein:

FIG. 6 is a view showing an example of a storage of infrared (IR) code values stored in the multimedia device according to one embodiment;

FIG. 7 is a view showing another example of a storage of IR code values stored in the multimedia device;

FIGS. 8 and 9 are views illustrating middleware storing the storage shown in FIG. 6 or 7;

FIGS. 13 and 14 are views showing a first embodiment of controlling an external electronic device using a screen provided by the multimedia device;

FIG. 37 is a diagram showing an example of a database stored in a memory 3560 shown in FIG. 35;

FIG. 38 is a diagram showing another example of a database stored in the memory 3560 shown in FIG. 35;

DETAILED DESCRIPTION

Figure 1:
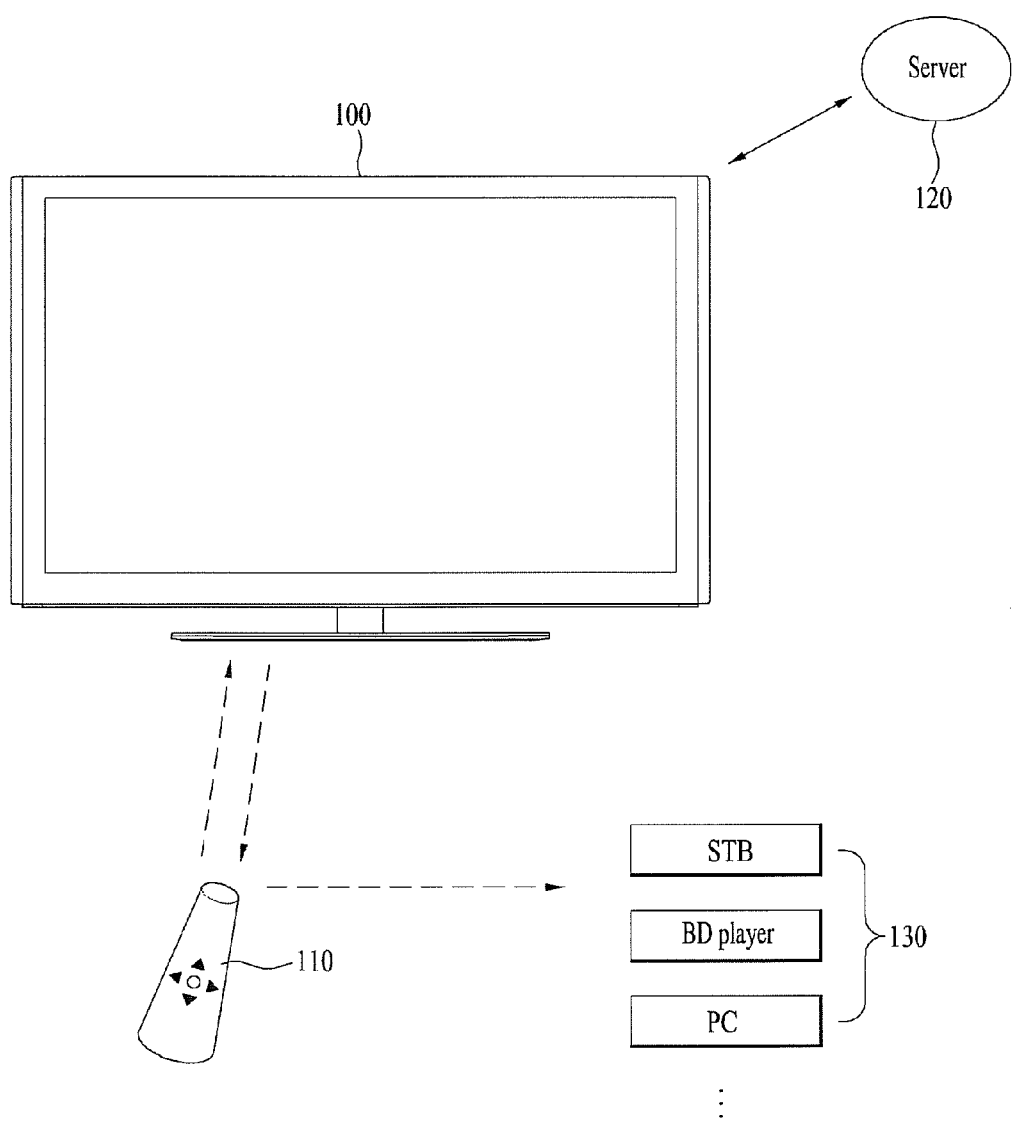
FIG. 1 is a view schematically showing a system including a multimedia device, a remote controller, a server, and at least one electronic device according to one embodiment.

Reference will now be made in detail to the preferred embodiments of the present invention, examples of which are illustrated in the accompanying drawings.

The words "module" and "unit", which are appended to terms describing components, are merely used for ease of explanation of the present invention and thus may be used interchangeably.

In accordance with one embodiment, a multimedia device is an intelligent electronic device having a computer or processor supporting function as well as a broadcast receiving function. As an Internet function is added to the multimedia device in addition to a broadcast receiving function, the multimedia device may include an interface which can be more conveniently used than a writing type input device, a touchscreen, a touchpad, or a space remote controller. Also, the multimedia device may be connected to the Internet or a computer under the support of a wired or wireless Internet function so that emailing, web browsing, banking, and gaming functions can be performed. For such various functions, a standardized general-purpose operating system (OS) may be used.

In accordance with one embodiment, the multimedia device may have various applications that can be freely added or removed, for example, on a general-purpose OS kernel, and therefore, it is possible to perform various user-friendly functions. More specifically, examples of the multimedia device may include an Internet television (TV), an Internet protocol TV (IPTV), a network TV, a hybrid broadcast broadband television (HBBTV), a smart TV, and an open hybrid TV (OHTV). Embodiments described herein may be applied, for example, to a smart phone, a personal computer (PC), or an electric home appliance.

A first embodiment provides a solution for controlling an STB, a BD player, a PC, a laptop computer, and a tablet PC using a universal remote controller to control a TV connected to the STB, the BD player, the PC, the laptop computer, and the tablet PC. For example, a TV capable of networking receives a table of infrared (IR) codes corresponding to the respective devices from an external server and stores the received table of IR codes. Also, the TV transmits an IR code value for controlling a specific function of a specific device to the remote controller through a radio frequency (RF) communication. Upon receiving the IR code value, the remote controller forwards the IR code value to the specific device through IR communication.

A second embodiment provides a solution for setting devices to be controlled to use a universal remote controller. In connection with this embodiment, it is possible to use the following three technical methods.

A) Automatic Detecting Technology

In a case in which a TV is connected to devices to be controlled using a universal remote controller via a high definition multimedia interface (HDMI), information regarding kinds, names, and model names of the devices is transmitted from the devices to the TV. Upon receiving the information regarding the devices, the TV may be connected to an external server so that the TV can automatically receive IR information corresponding to the respective devices. In this case, it is not necessary for a user to register the devices. Of course, the device connected to the TV via the HDMI or a cable may not transmit the above-mentioned information, or errors may occur, according to circumstances. The following solutions described in paragraph B) and C) may solve the above problems.

B) Hybrid Technology

In a case in which the TV is connected to a STB, the TV displays identification information of at least one STB manufacture or cable station that can be selected by a user. For example, in a case in which the number of enterprises providing a related service in Korea is three (for example, QOOK TV, BTV, and UPLUS), an option for selecting one of the three enterprises is provided. At this time, in a case in which the user selects a specific enterprise, the TV automatically receives an IR table corresponding to a remote controller of the corresponding enterprise from an external server.

C) User Input Method

The technology described in paragraph B) may not be used due to change of networking environment or technical errors. For this reason, it is possible for a user to directly input the kind and model name of an external device to be controlled using a universal remote controller.

A third embodiment provides a solution for controlling an OSD provided by an external device, e.g. an STB, not an OSD provided by the TV, using a remote controller. (In particular, a remote controller according to one embodiment is designed such that the position of a pointer on a screen of the TV according to the motion of the remote controller.)

The TV displays a TV OSD for controlling the STB connected to the TV via a HDMI. At this time, the motion of the remote controller may be controlled to locate the pointer in a corresponding region so that a user can easily execute a desired function of the STB. On the other hand, other functions which are not provided by the TV OSD may be considered. For example, functions which were not provided by an initial STB or menu options are not provided by the TV OSD. At this time, of course, an STB OSD is displayed. However, the STB OSD is image data that cannot be selected using a pointer of a motion remote controller. Therefore, it is necessary to provide a solution for controlling the STB OSD by clicking an arrow button of the motion remote controller.

For example, in a case in which a downward arrow button of the motion remote controller is clicked, an RF signal corresponding thereto is transmitted to the TV. The TV transmits an IR signal corresponding thereto to the remote controller via an RD network.

A fourth embodiment provides a channel browsing function which is flexibly changed based on a connected STB, not an electronic program guide (EPG) provided by the existing broadcasting station. Also, the following two methods may be considered as a solution for realizing the fourth embodiment.

A) It is assumed that there is an external server that knows information (for example, thumbnail images, broadcast time, supplementary information, characters, etc.) regarding all channels provided by the corresponding STB. Consequently, it is possible for the TV according to one embodiment to inform the external server of the type of the presently connected STB so that the TV can receive information regarding each channel. Also, at least two pieces of channel information may be located at one side of the screen, and a user may generate the motion of the remote controller to easily confirm a desired channel group.

B) On the other hand, if the server as described in paragraph A) does not exist, the TV may be operated in a background mode to scan the respective channels. For example, the respective channels may be scanned to capture video information or audio information with the result that it is possible to extract basic information or thumbnail image data regarding content provided by the respective channels.

FIG. 1 is a view schematically showing a system including a multimedia device 100, a remote controller 110, a server 120, and at least one electronic device 130 according to one embodiment.

According to some applications, it is necessary to provide a plurality of remote controllers 110 corresponding to the number of electronic devices 130 to be controlled. Also, it is necessary for a universal remote controller to store all IR code values of the respective electronic devices 130. However, a remote controller of this type has limited memory capacity which makes it difficult or impossible to store all IR code values of the respective electronic devices 130.

In contrast, multimedia device 100 may periodically update IR code values necessary to control electronic devices from the server 120 connected to the multimedia device 100 via a network, such as the Internet. An embodiment of updating IR code values according to user request may correspond to one specific embodiment.

Meanwhile, it is assumed that the remote controller 110 and the multimedia device 100 transmit and receive data to and from each other using a first communication method (for example, Bluetooth). If the remote controller 110 requests an IR code value corresponding to a specific function of a specific electronic device from the multimedia device 100, the multimedia device 100 retrieves a storage (DB) stored therein and transmits a corresponding IR code value to the remote controller 110.

The remote controller 110 forwards the IR code value received from the multimedia device 100 to a corresponding electronic device 130 using a second communication method (for example, IR communication). That is, according to one embodiment, remote controller 110 may serve as a relay station and therefore, it is not necessary to use a large-capacity memory.

Figure 2:
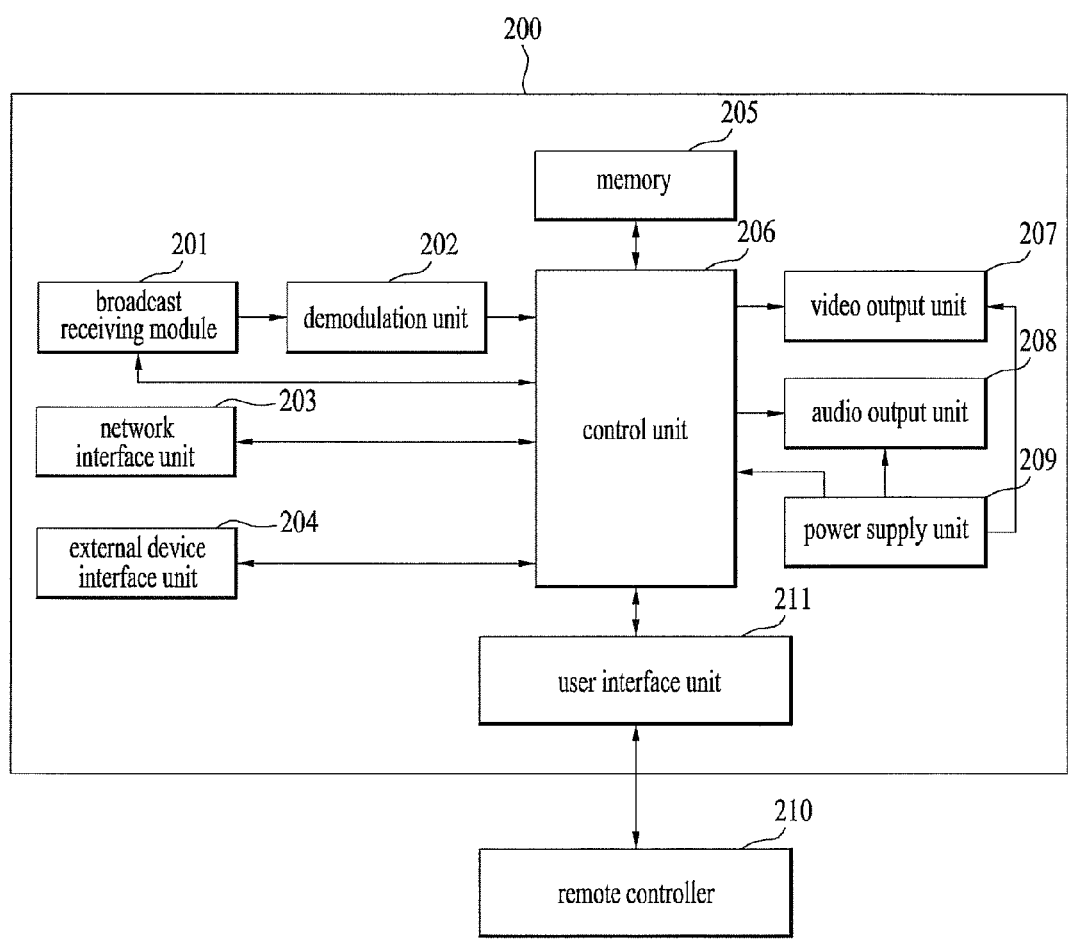
FIG. 2 is a block diagram showing components of a multimedia device according to one embodiment.

FIG. 2 is a block diagram showing components of a multimedia device according to one embodiment. A multimedia device 200 shown in FIG. 2 may be supplementarily interpreted with reference to the description of the multimedia device 100 shown in FIG. 1.

As shown in FIG. 2, the multimedia device 200 according to one embodiment includes a broadcast receiving module 201, a demodulation unit 202, a network interface unit 203, an external device interface unit 204, a memory 205, a control unit 206, a video output unit 207, an audio output unit 208, a power supply unit 209, and a user interface unit 211. The multimedia device 200 is designed to perform data communication with a remote controller 210. The remote controller 210 will be described below in detail with reference to FIGS. 4 and 5.

The broadcast receiving module 201 may be designed, for example, as a RF tuner or as an interface for receiving broadcast data from an external device, such as a set top box (STB). The broadcast receiving module 201 may receive, for example, a single carrier RF broadcast signal according to an advanced television system committee (ATSC) system or a plural carrier RF broadcast signal according to a digital video broadcasting (DVB) system.

The demodulation unit 202 receives and demodulates a digital IF signal DIF converted by the broadcast receiving module 201. For example, in a case in which the digital IF signal output from the broadcast receiving module 201 is based on the ATSC system, the demodulation unit 202 performs, for example, 8-vestigal side band (8-VSB) demodulation. Also, the demodulation unit 202 may perform channel decoding.

The external device interface unit 204 enables data communication between an external device and the multimedia device 200. The external device interface unit 204 may be connected to an external device, such as a digital versatile disk (DVD) player, a Blu-ray disc (BD) player, a game console, a camera, a camcorder, a computer (laptop computer), or an STB, in a wired or wireless fashion. The external device interface unit 204 transmits video, audio, or data signals input from the outside via the external device connected to the external device interface unit 204 to the control unit 206. Also, the external device interface unit 204 may output video, audio, or data signals processed by the control unit 206 to the external device.

The external device interface unit 204 may include, for example, a universal serial bus (USB) terminal, a composite video banking sync (CVBS) terminal, a component terminal, an S-video terminal (analog), a digital visual interface (DVI) terminal, a high definition multimedia interface (HDMI) terminal, a RGB terminal, and a D-SUB terminal.

The network interface unit 203 provides an interface for connecting the multimedia device 200 to a wired/wireless network, including the Internet. The network interface unit 203 may include, for example, an Ethernet terminal for connection with a wired network. Also, the network interface unit 203 may use communication standards, such as wireless LAN (WLAN) (Wi-Fi), wireless broadband (WiBro), world interoperability for microwave access (WiMax), high speed downlink packet access (HSDPA), for connection with a wireless network.

The network interface unit 203 may transmit or receive data to or from another user or another electronic device via the network connected to the network interface unit 203 or another network linked to the network connected to the network interface unit 203.

The memory 205 may store a program for processing and controlling signals in the control unit 206 or a signal-processed video, audio, or data signal. Also, the memory 205 may function to temporarily store the video, audio, or data signal input from the external device interface unit 204 or the network interface unit 203. In addition, the memory 205 stores, for example, various operating systems (OS), middleware, and a platform.

The user interface unit 211 may transmit a signal input by a user to the control unit 206 or may transmit a signal from the control unit 206 to an external device (for example, the remote controller 210). For example, the user interface unit 211 is designed to receive and process a control signal, such as power on/off, channel selection, or screen setting, or to transmit a control signal from the control unit 206 to the remote controller 210, according to various communication modes, such as a radio frequency (RF) communication mode and an infrared (IR) communication mode.

The control unit 206 may demultiplex a stream input via the broadcast receiving module 201, the demodulation unit 202, the network interface unit 203, or the external device interface unit 204, or may process demultiplexed signals to generate and output a signal for outputting a video or audio. The control unit 206 will be described below in more detail with reference to FIG. 3.

The video output unit 207 converts a video signal, a data signal, or an OSD signal processed by the control unit 206 or a video signal or a data signal received by the external device interface unit 204 into red (R), green (G), and blue (B) signals to generate a drive signal. The video output unit 207 may be realized by a plasma display panel (PDP), a liquid crystal display (LCD), an organic light emitting diode (OLED), a flexible display, or a three-dimensional (3D) display.

The audio output unit 208 receives a signal, such as a stereo signal, a 3.1 channel signal, or a 5.1 channel signal, audio-processed by the control unit 206, and outputs the received signal as an audio. The audio output unit 208 may be realized by various types of speakers.

The power supply unit 209 supplies power to the multimedia device 200. In particular, the power supply unit 170 may supply power to the control unit 206, which may be configured in the form of a system on chip (SOC), the video output unit 207 for displaying a video, and the audio output unit 208 for outputting an audio.

Under control of the control unit 206, the network interface unit 203 is connected to a specific server. In addition, IR code values received from the specific server are designed to be stored in the memory 205. Meanwhile, the IR code values are necessary to control an electronic device connected to external device interface unit 204.

According to request of the remote controller 210, an IR code value corresponding to a specific function of a specific electronic device is transmitted to the remote controller 210 via the user interface unit 211. At this time, a Bluetooth communication method may be adopted as previously described.

Figure 3:
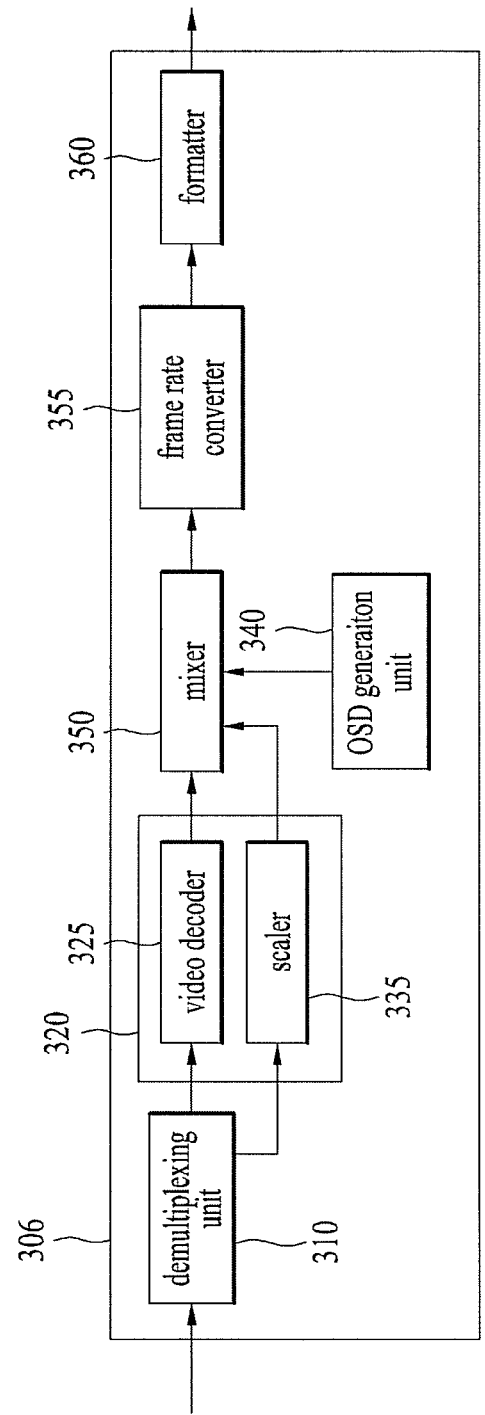
FIG. 3 is a block diagram showing a control unit shown in FIG. 2.

FIG. 3 is a block diagram showing the control unit shown in FIG. 2 in more detail. As shown in FIG. 3, the control unit 306 of the multimedia device includes a demultiplexing unit 310, a video processing unit 320, an OSD generation unit 340, a mixer 350, a frame rate converter 355, and a formatter 360. Also, according to another embodiment, the control unit may further include an audio processing unit and a data processing unit.

The demultiplexing unit 310 demultiplexes a stream input to the demultiplexing unit 310. For example, in a case in which MPEG-2 TS is input to the demultiplexing unit 310, the demultiplexing unit 310 may demultiplex the MPEG-2 TS so that the MPEG-2 TS is divided into video, audio, and data signals.

The video processing unit 320 may process the demultiplexed video signal. To this end, the video processing unit 320 may include a video decoder 325 and a scaler 335. The video decoder 325 decodes the demultiplexed video signal, and the scaler 335 scales the resolution of the decoded video signal so that the decoded video signal can be output to the video output unit. The video signal decoded by the video processing unit 320 is input to the mixer 350.

The OSD generation unit 340 generates an OSD signal according to user input or by itself. Consequently, the mixer 350 may mix the OSD signal generated by the OSD generation unit 340 with the decoded video signal processed by the video processing unit 320.

The mixed signal is provided to the formatter 360. As the decoded broadcast video signal or an external input signal is mixed with the OSD signal, an OSD may be overlaid on a broadcast video or an external input video.

The frame rate converter (FRC) 355 may convert the frame rate of an input video. For example, the frame rate converter 355 may convert a frame rate of 60 Hz into 120 Hz or 240 Hz.

The formatter 360 receives a signal output from the frame rate converter 355, changes the format of the received signal so that the signal is suitable for the video output unit, and outputs the signal, the format of which has been changed. For example, R, G, and B data signals may be output. The R, G, and B data signals may be output as low voltage differential signaling (LVDS) or mini-LVDS.

An OSD to select an electronic device and a function to be controlled by the remote controller may be generated by the OSD generation unit 340 as described above. Also, the above-mentioned mixer 350 may be further designed to make a form in which the OSD is overlaid on a general broadcast screen. The form in which the OSD is overlaid on the general broadcast screen may be understood from the description given with reference to FIGS. 10 to 18.

Figure 4:
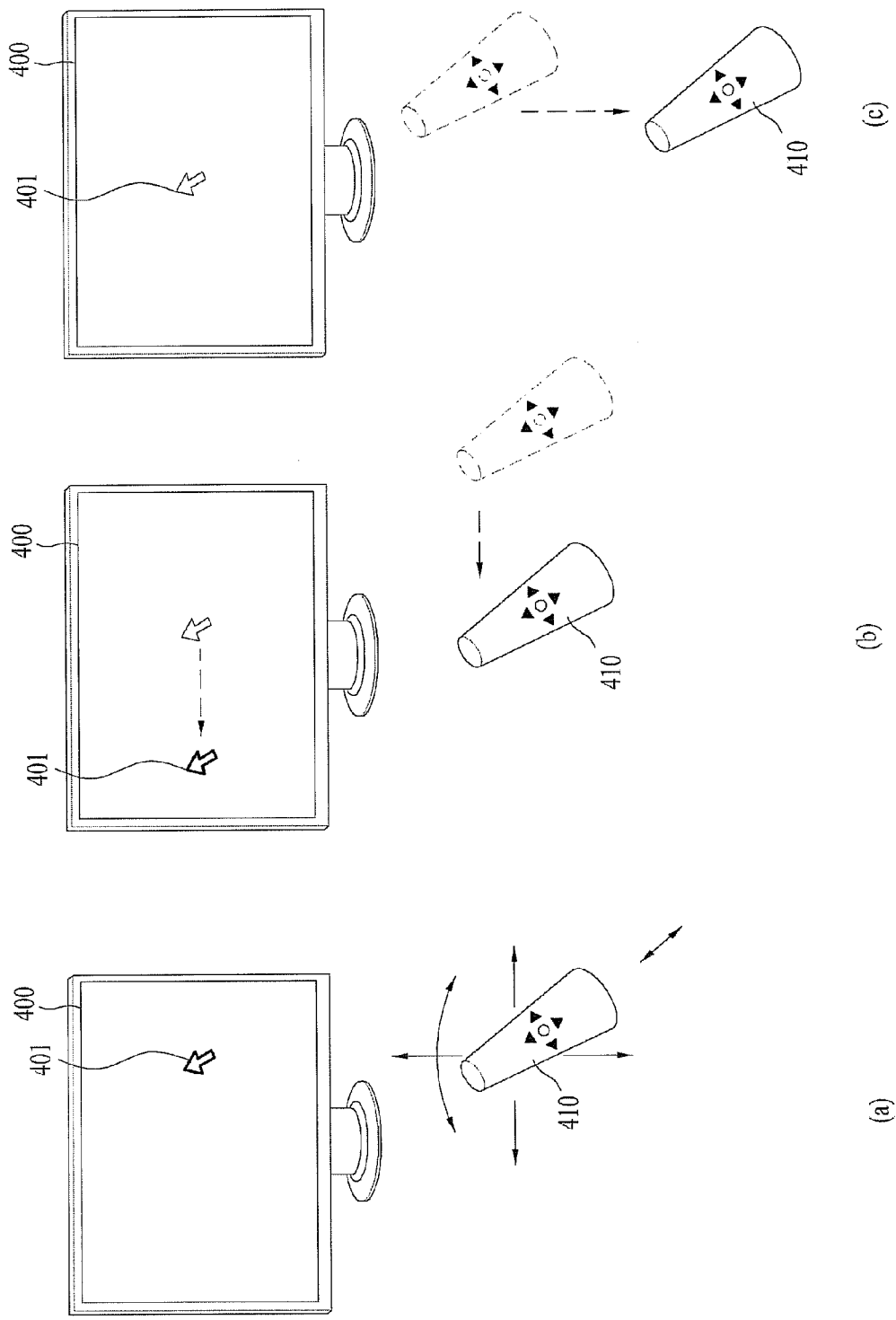
FIG. 4 is a view simply showing the external appearance of a remote controller according to one embodiment.

FIG. 4 is a view simply showing the external appearance of a remote controller according to one embodiment. As shown in FIG. 4(*a*), a pointer 401 corresponding to motion of a remote controller 410 is displayed on a screen of a multimedia device 400. A user may move the remote controller 410 from side to side (FIG. 4(*b*)) or upward and downward (FIG. 4(*c*)), or may rotate the remote controller 410. The remote controller 410 may be referred to as a space remote controller since the pointer 401 is moved and displayed according to the motion of the remote controller 410 in a three-dimensional (3D) space.

When the user moves the remote controller 410 to the left side as shown in FIG. 4(*b*), the pointer 401 displayed on the screen of the multimedia device 400 also moves to the left side. Meanwhile, information regarding the motion of the remote controller 410 sensed by a sensor of the remote controller 410 is transmitted to the multimedia device 400. The multimedia device 400 may calculate coordinates of the pointer 401 from the information regarding the motion of the remote controller 410. The multimedia device 400 may display the pointer 401 so that the pointer 401 corresponds to the calculated coordinates.

On the other hand, when the user moves the remote controller 410 downward as shown in FIG. 4(*c*), the pointer 401 displayed on the screen of the multimedia device 400 also moves downward. Therefore, it is possible to rapidly select a specific region in the screen of the multimedia device 400 using remote controller 410.

Figure 5:
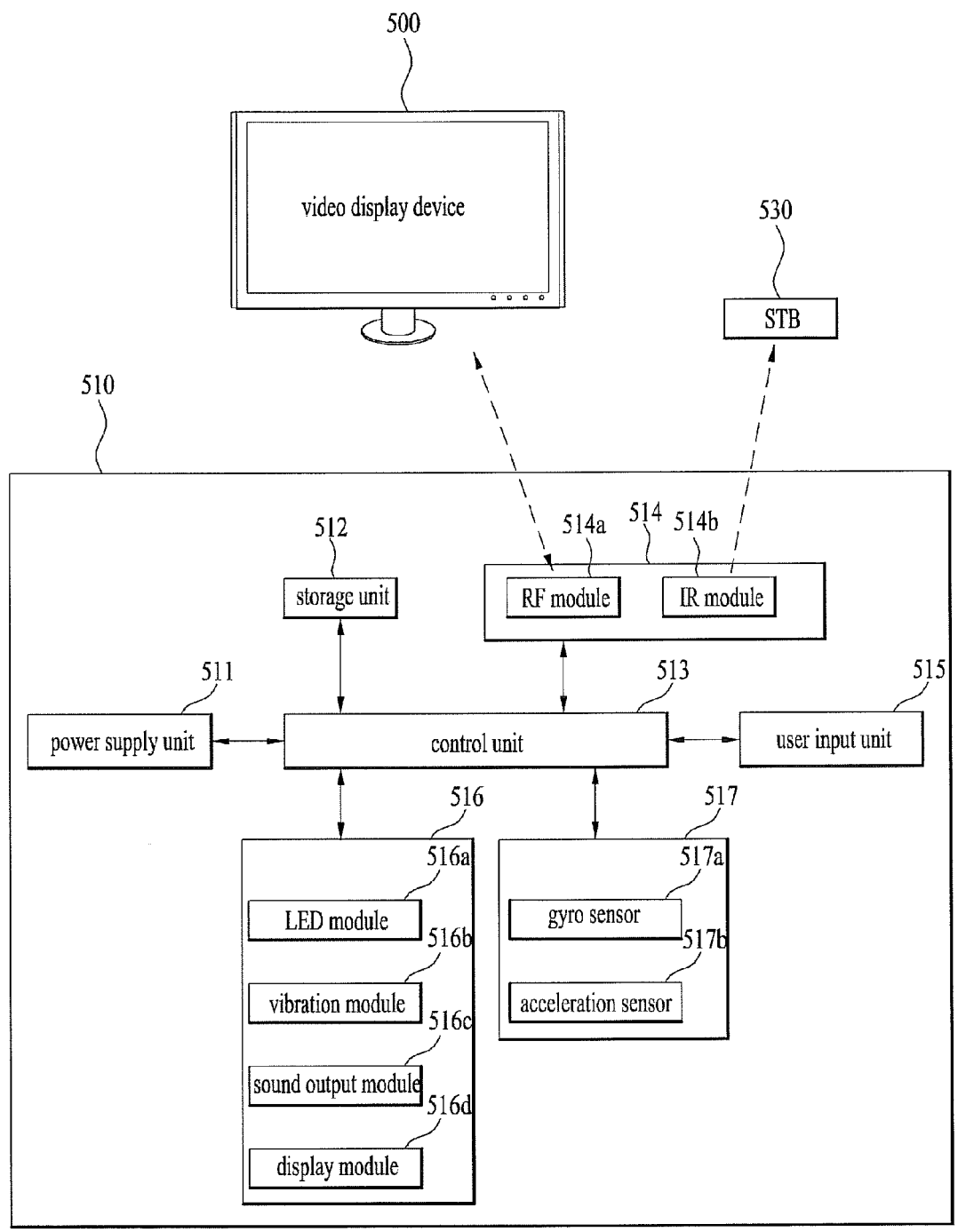
FIG. 5 is a block diagram showing components of the remote controller shown in FIG. 4.

FIG. 5 is a block diagram showing components of the remote controller shown in FIG. 4 in detail. As shown in FIG. 5, the remote controller 510 includes a wireless communication unit 514, a user input unit 515, a sensor unit 517, an output unit 516, a power supply unit 511, a storage unit 512, and a control unit 513.

The wireless communication unit 514 is designed to communicate with an arbitrary external device. In particular, according to one embodiment, an RF module 514*a* is designed to perform data communication with a multimedia device 500, and an IR module 514*b* is designed to perform infrared communication with an external electronic device 530 (for example, an STB).

Therefore, it is possible to realize the remote controller 510 so that the remote controller 510 can serve as a relay station for forwarding an IR code value received from the multimedia device 500 to the STB 530.

In addition, according to one embodiment, the remote controller 510 transmits a signal containing information regarding the motion of the remote controller 510 to the multimedia device 500 via the RF module 514*a*. Also, the remote controller 510 may receive a signal transmitted from the multimedia device 500 via the RF module 514*a*. Also, the remote controller 510 may transmit a command for power on/off, channel change, or volume change to the multimedia device 500 via the IR module 514*b*, as needed.

The user input unit 515 may be realized by a keypad, a button, a touchpad, or a touchscreen. The sensor unit 517 may include a gyro sensor 517*a* or an acceleration sensor 517*b*. The gyro sensor 517*a* may sense information regarding the motion of the remote controller 510. For example, the gyro sensor 517*a* may sense information regarding the motion of the remote controller 510 on the basis of x, y, and z axes. The acceleration sensor 517*b* may sense information regarding movement velocity of the remote controller 510. Meanwhile, the sensor unit 517 may further include a distance measurement sensor for sensing the distance between the remote controller 510 and the multimedia device 500.

The output unit 516 may output a video or audio signal corresponding to the manipulation of the user input unit 515 or a signal transmitted from the multimedia device 500. For example, the output unit 516 may include a light emitting diode (LED) module 516*a* configured to be driven when the user input unit 515 is manipulated or when a signal is transmitted and received between the remote controller 510 and the multimedia device 500 through the wireless communication unit 514, a vibration module 516*b* for generating vibration, a sound output module 516*c* for outputting a sound, or a display module 516*d* for outputting a video.

The power supply unit 511 supplies power to the respective components of the remote controller 510. When the remote controller 510 is not moved for a predetermined time, the power supply unit 511 may stop the supply of power to the remote controller 510 to reduce power consumption.

The storage unit 512 may store various kinds of programs necessary for control or motion of the remote controller 510 and application data. The control unit 513 controls overall operations of the remote controller 510. For example, the control unit 513 may transmit a signal corresponding to predetermined key manipulation of the user input unit 515 or a signal corresponding to the motion of the remote controller 510 sensed by the sensor unit 517 to the multimedia device 500 or to the STB 530 through the wireless communication unit 514.

FIG. 6 is a view showing an example of a storage of IR code values stored in the multimedia device according to one embodiment. The memory 205 of the multimedia device as shown in FIG. 2 is designed so that a storage shown in FIG. 6 is constructed in the memory 205. As shown in FIG. 6, IR code values corresponding to functions of a television, one example of an external electronic device, are mapped. Also, the storage shown in FIG. 6 is updated through communication with an external server according to user request or periodically.

Since the multimedia device according to one embodiment includes the storage shown in FIG. 6, it is possible for the multimedia device to transmit an IR code value corresponding to a specific function of a specific electronic device at any time according to request of the remote controller.

FIG. 7 is a view showing another example of a storage of IR code values stored in the multimedia device according to one embodiment. As shown in FIG. 7, the storage is designed so that information regarding a plurality of devices is stored in different memory addresses, unlike FIG. 6. That is, IR code values corresponding to functions of a STB are stored in a first memory address, and IR code values corresponding to functions of a Blu-ray disc (BD) player are stored in a second memory address.

In a case in which the storage is designed as shown in FIG. 7, therefore, it is possible to realize an OSD corresponding to a specific electronic device and to increase access speed to a specific function of the specific electronic device.

Although two devices are illustrated in FIG. 7, the number of external electronic devices that can be controlled by one remote controller may be greater than two since the multimedia device can update the storage shown in FIG. 7 at any time through communication with a server. Therefore, in at least some applications, it is not necessary to change the memory of the remote controller.

FIGS. 8 and 9 are views illustrating middleware storing the storage shown in FIG. 6 or 7. Specifically, FIGS. 8 and 9 are views illustrating a design structure of middleware necessary to construct the above-mentioned storage (see FIG. 6 or 7). For example, the middleware may be designed so that the storage shown in FIG. 6 or 7 is located in a native application as shown in FIG. 8.

According to one embodiment, the middleware may be designed so that the storage shown in FIG. 6 or 7 is located in a flash engine or browser. Meanwhile, in a case in which the middleware is designed as shown in FIG. 8, it is unnecessary to change the structure of the existing platform.

In addition, in a case in which another external electronic device, instead of the multimedia device, is to be controlled using the remote controller, two solutions for specifying the external electronic device may be proposed. A first solution will hereinafter be described with reference to FIG. 10 and a second solution will be described below with reference to FIG. 11.

Figure 10:
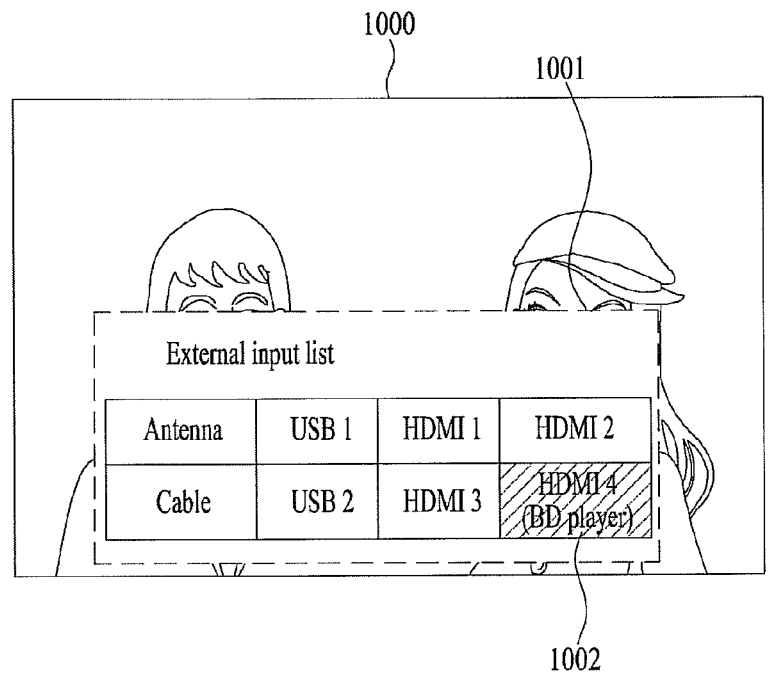
FIG. 10 is a view illustrating a first on screen display (OSD) provided by the multimedia device according to one embodiment.

FIG. 10 is a view illustrating a first on screen display (OSD) provided by the multimedia device. The OSD shown in FIG. 10 is displayed when a user pushes a key button for selecting an external input list. For example, in a case in which a user, who is watching a broadcast through a multimedia device 1000, wishes to control another external electronic device, the user may push a key button attached to the remote controller or a local key button attached to the multimedia device 1000.

At this time, the multimedia device 1000 displays an external input list 1001 which can be selected by the user as shown in FIG. 10. The external input list 1001 may be limited to devices having IR code values stored in the multimedia device.

Also, the external input list 1001 may include a region 1002 for displaying not only names of primary terminals but also names of devices connected via the corresponding terminals. Therefore, it is possible for a user to more easily and rapidly select a device which the user wishes to control.

Figure 11:
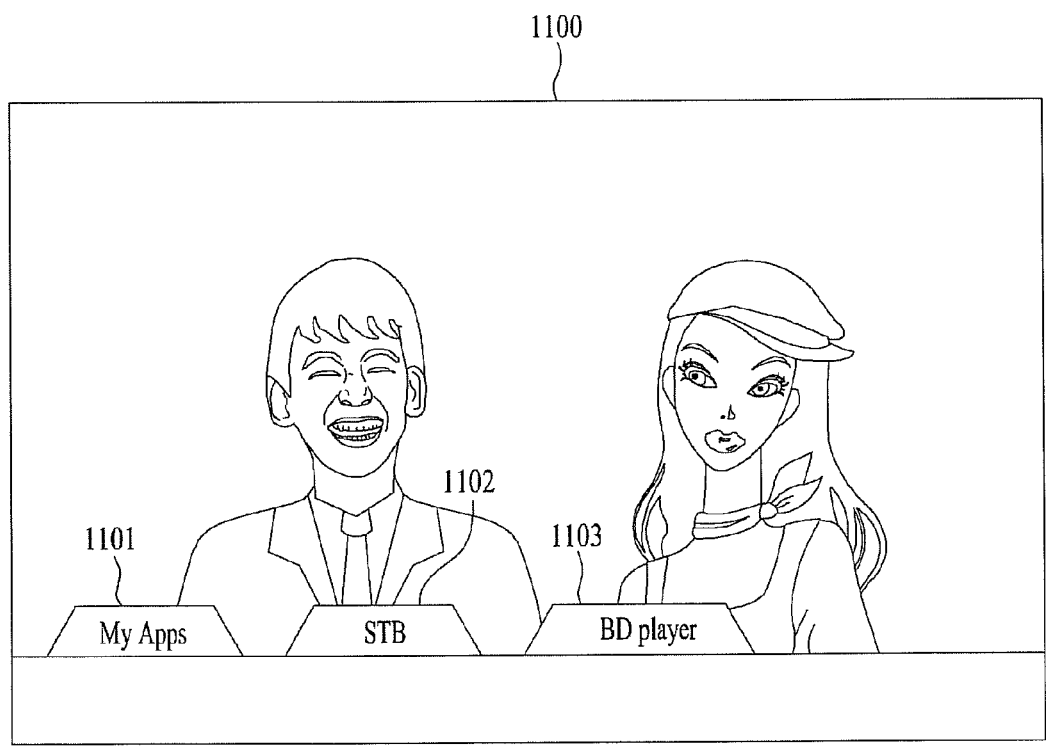
FIG. 11 is a view illustrating a second OSD provided by the multimedia device according to one embodiment.

FIG. 11 is a view illustrating a second OSD provided by the multimedia device according to another embodiment. As shown in FIG. 11, a list of devices that can be controlled using the remote controller is displayed in the form of tabs, unlike FIG. 10. For example, in a case in which a user, who is watching a broadcast through a multimedia device 1100, wishes to control another external electronic device, the user may push a key button attached to the remote controller or a local key button attached to the multimedia device 1100.

At this time, the multimedia device 1100 displays external input devices which can be controlled by the user in the form of tabs 1102 and 1103, as shown in FIG. 11. The tabs 1102 and 1103 may be limited to devices having IR code values stored in the multimedia device. Meanwhile, a tab 1101 may be displayed showing a list of stored applications.

In a case in which the OSD is designed as shown in FIG. 11, it is possible for a user to easily and conveniently select a device which the user wishes to control while maintaining a broadcast screen which the user can watch to the maximum.

Meanwhile, two solutions for controlling an external electronic device using the remote controller may be provided. In a first embodiment, it is possible to directly control basic functions of the external electronic device without using the screen of the multimedia device, which will hereinafter be described with reference to FIG. 12. In a second embodiment, supplemental functions of the external electronic device are controlled using the screen of the multimedia device, which will be described below with reference to FIGS. 13 to 18.

Figure 12:
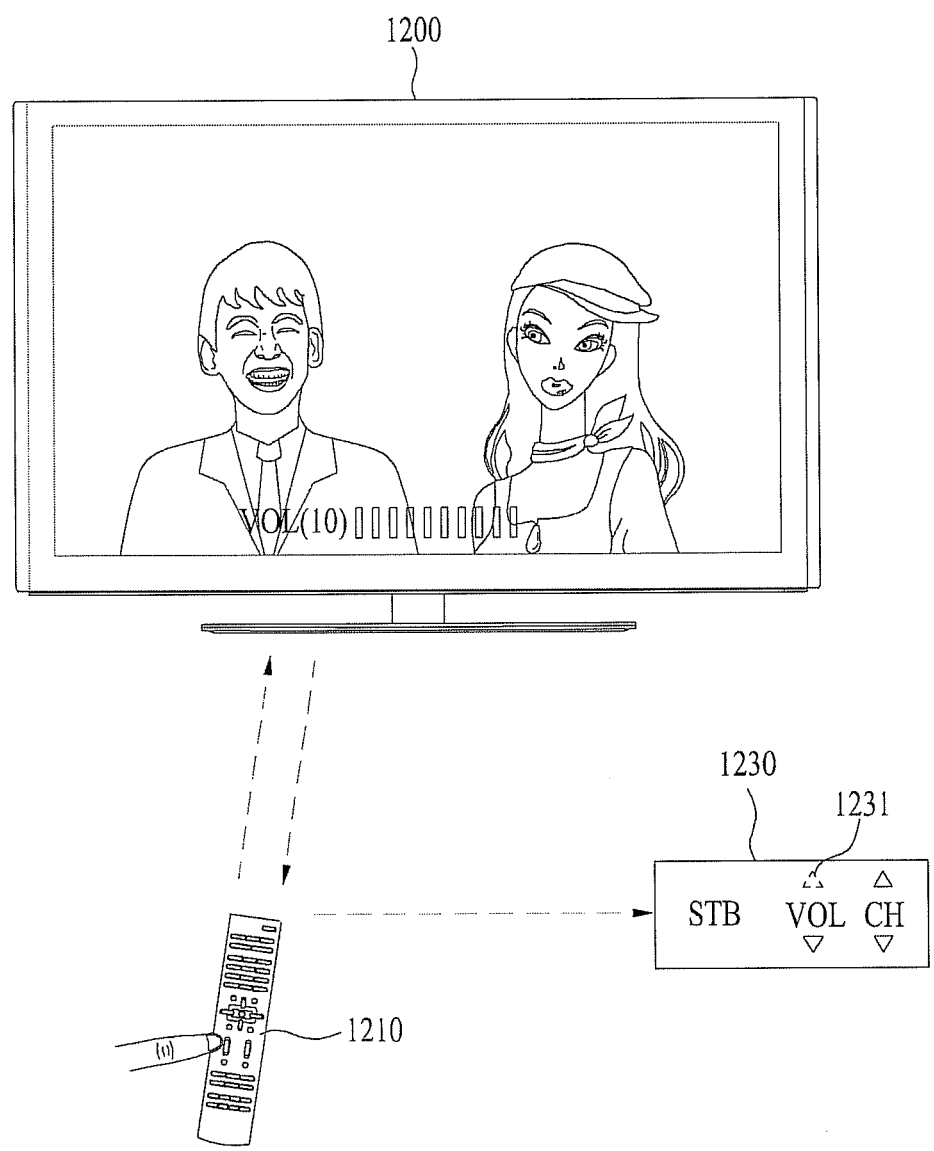
FIG. 12 is a view showing a process of controlling an external electronic device using a local key button of the remote controller according to one embodiment.

FIG. 12 is a view showing a process of controlling an external electronic device using a local key button of the remote controller according to one embodiment. Hereinafter, a process of rapidly control an external electronic device while securing the screen of the multimedia device to the maximum extent possible will be described with reference to FIG. 12.

First, selection of controlling a specific external device (for example, an STB) using the method shown in FIG. 10 or 11 is assumed. As shown in FIG. 12, a remote controller 1210 may include a local key button for adjusting a volume of the STB or changing a channel of the STB.

When a user pushes a volume up button of the remote controller 1210, a signal for requesting an IR code value corresponding to volume up of the STB is transmitted to a multimedia device 1200. The multimedia device 1200 transmits an IR code value corresponding to volume up of the STB to the remote controller 1210, and the remote controller 1210 forwards the received IR code value to a corresponding STB 1230. Consequently, it is possible for the STB 1230 to perform a volume up function 1231 based on the IR code value received from the remote controller 1210.

Figure 13:
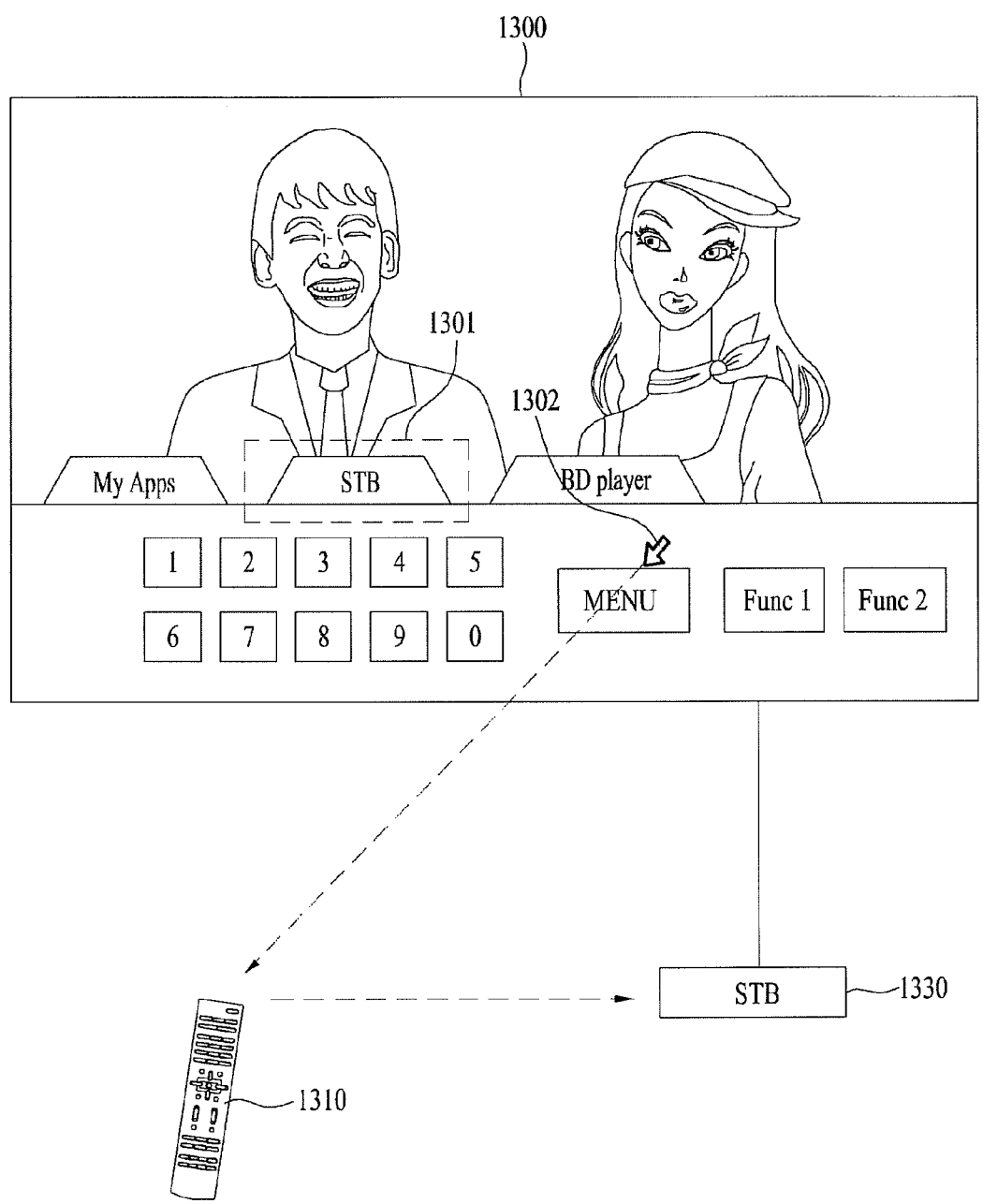

FIGS. 13 and 14 are views showing a first embodiment of controlling an external electronic device using the screen provided by the multimedia device. Hereinafter, a process of controlling a function of an external electronic device (for example, a menu function of an STB), which is not attached to the outside of the remote controller as a local key button, will be described with reference to FIGS. 13 and 14.

First, selection of a tab 1301 displaying a STB as a device to be controlled using the method shown in FIG. 11 is assumed. At this time, a multimedia device 1300 according to one embodiment displays an OSD regarding functions of the selected STB, as shown in FIG. 13. The OSD is stored in the memory of the multimedia device for each device. Functions of the OSD shown in FIG. 13 are designed in a format that can be selected by a remote controller 1310.

In a case in which a user moves the remote controller 1310 with the result that an indicator 1302 is located in a menu region of the STB, the multimedia device 1300 transmits an IR code value corresponding to the menu of the STB to the remote controller 1310. The remote controller 1310 transmits the IR code value received from the multimedia device 1300 to a corresponding electronic device, i.e. an STB 1330.

In a case in which a menu function of a STB 1430 is executed as shown in FIG. 14, therefore, a multimedia device 1400 connected to the STB 1430 displays a screen 1401 on which the STB menu is executed. Also, a specific option on screen 1410, on which the STB menu is executed, may be selected using remote controller 1410.

Figure 15:
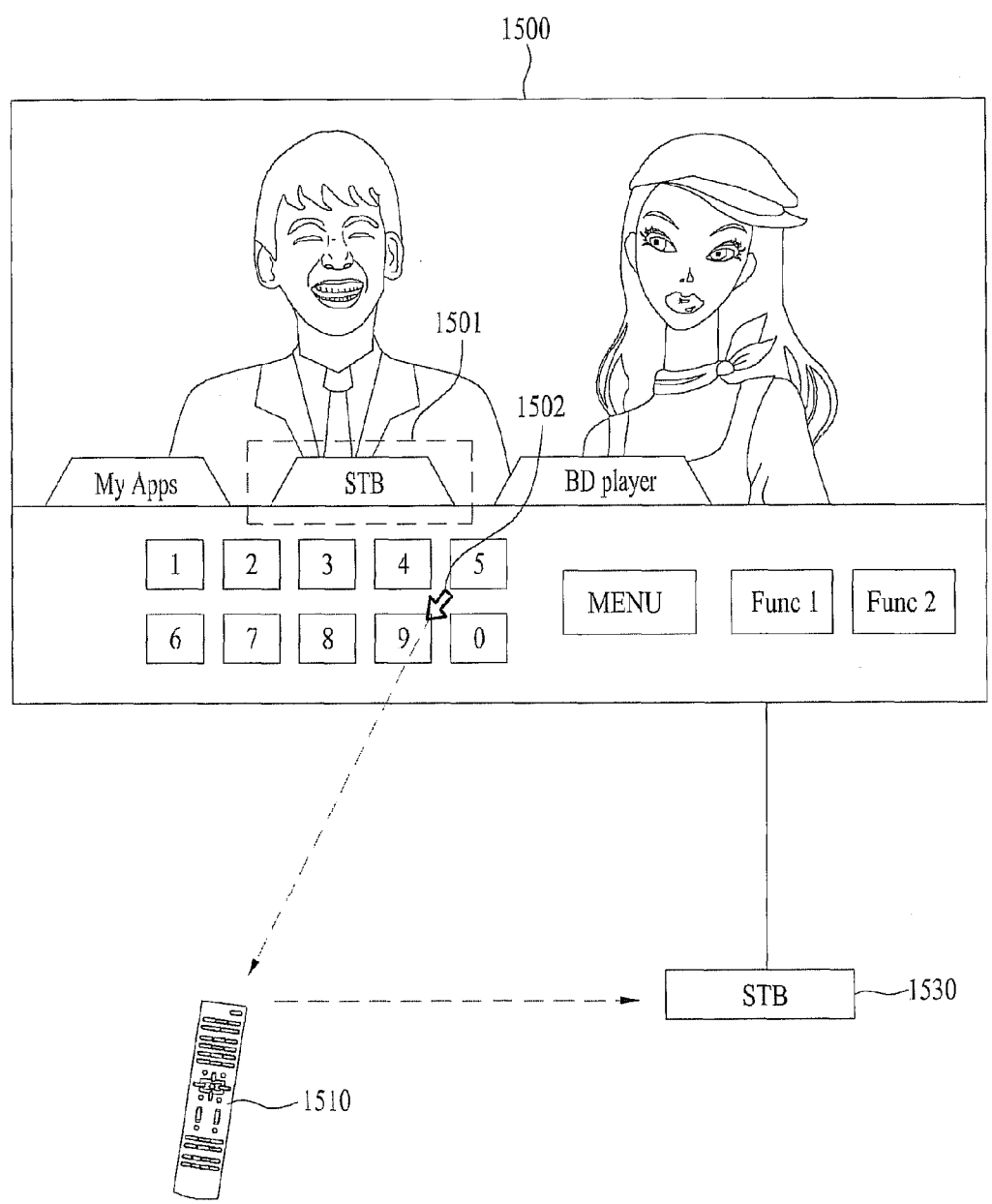
FIGS. 15 and 16 are views showing a second embodiment of controlling the external electronic device using the screen provided by the multimedia device.
Figure 16:
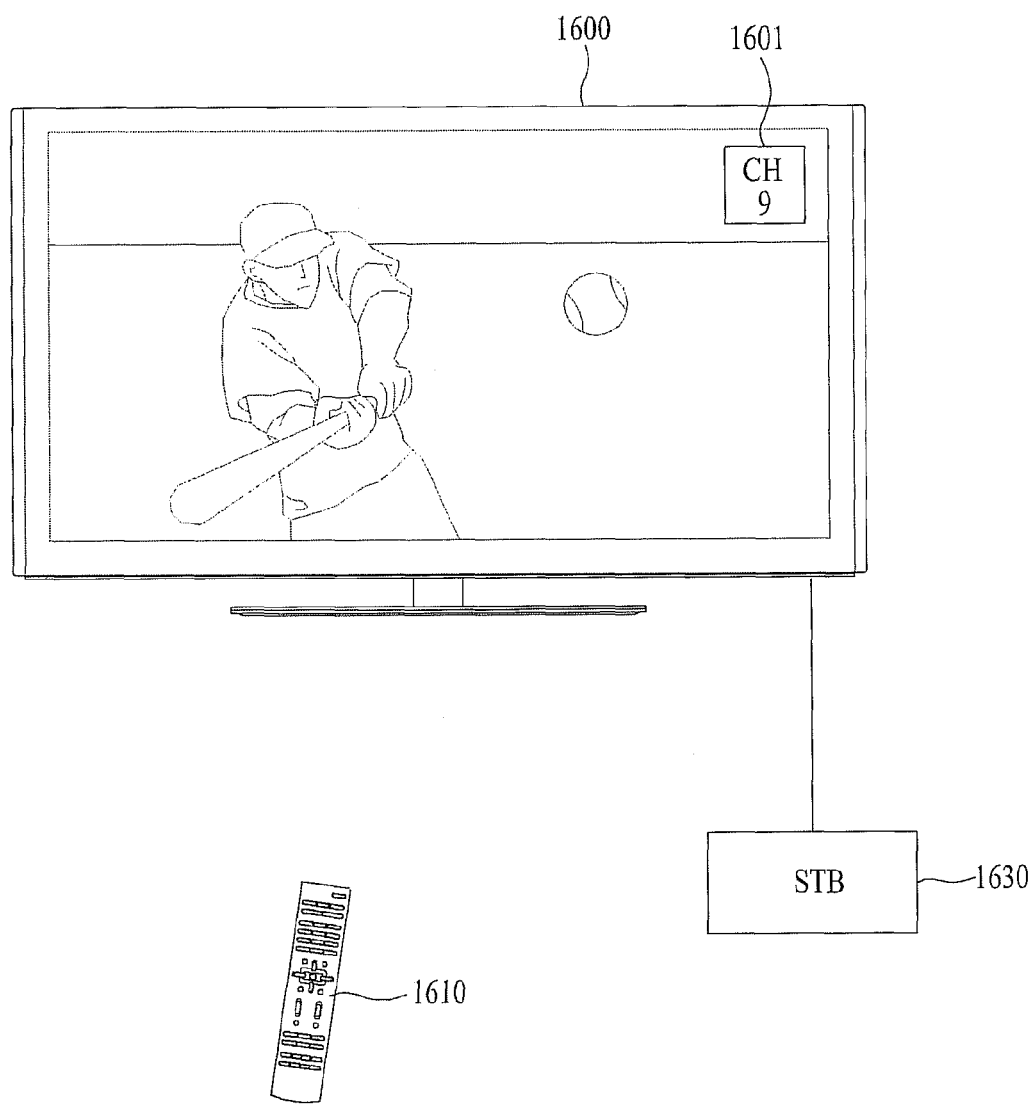

FIGS. 15 and 16 are views showing a second embodiment of controlling the external electronic device using the screen provided by the multimedia device. Hereinafter, a process of controlling a function of an external electronic device (for example, a channel 9 function of a STB), which is not attached to the outside of the remote controller as a local key button will be described with reference to FIGS. 15 and 16.

First, selection of a tab 1501 displaying a STB as a device to be controlled using the method shown in FIG. 11 is assumed. At this time, a multimedia device 1500 according to an embodiment displays an OSD regarding functions of the selected STB, as shown in FIG. 15.

The OSD is stored in the memory of the multimedia device for each device. Functions of the OSD shown in FIG. 15 are designed in a format that can be selected by a remote controller 1510.

In a case in which a user moves the remote controller 1510 with the result that an indicator 1502 is located in a channel 9 region of the STB, the multimedia device 1500 transmits an IR code value corresponding to the channel 9 function of the STB to the remote controller 1510.

The remote controller 1510 transmits the IR code value received from the multimedia device 1500 to a corresponding electronic device, i.e. an STB 1530.

In a case in which a channel 9 function of a STB 1630 is executed as shown in FIG. 16, therefore, a multimedia device 1600 connected to the STB 1630 displays a screen 1601 corresponding to channel 9. Also, it is possible to further control other functions of the STB 1630 using a remote controller 1610.

Figure 17:
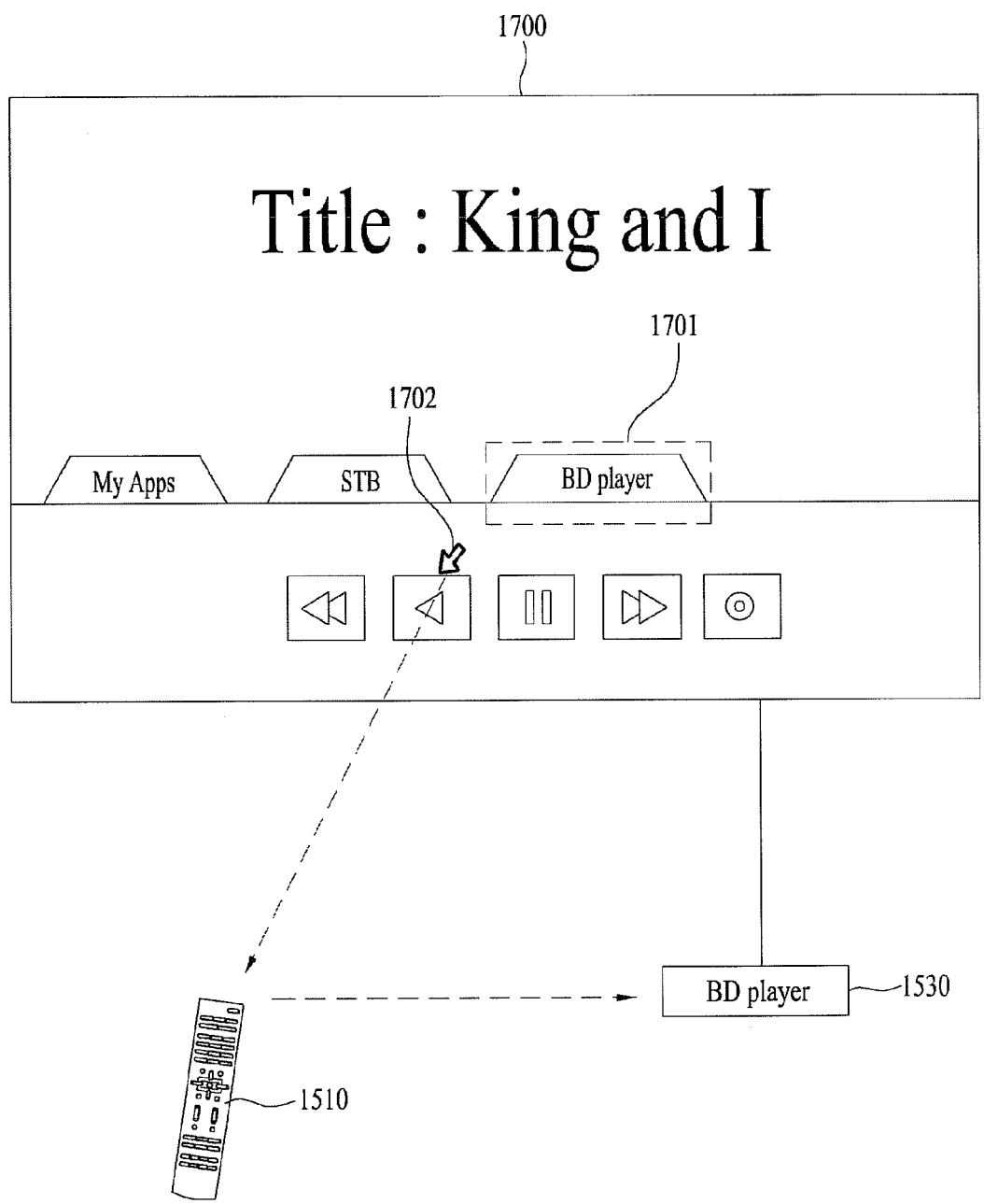
FIGS. 17 and 18 are views showing a third embodiment of controlling the external electronic device using the screen provided by the multimedia device.
Figure 18:
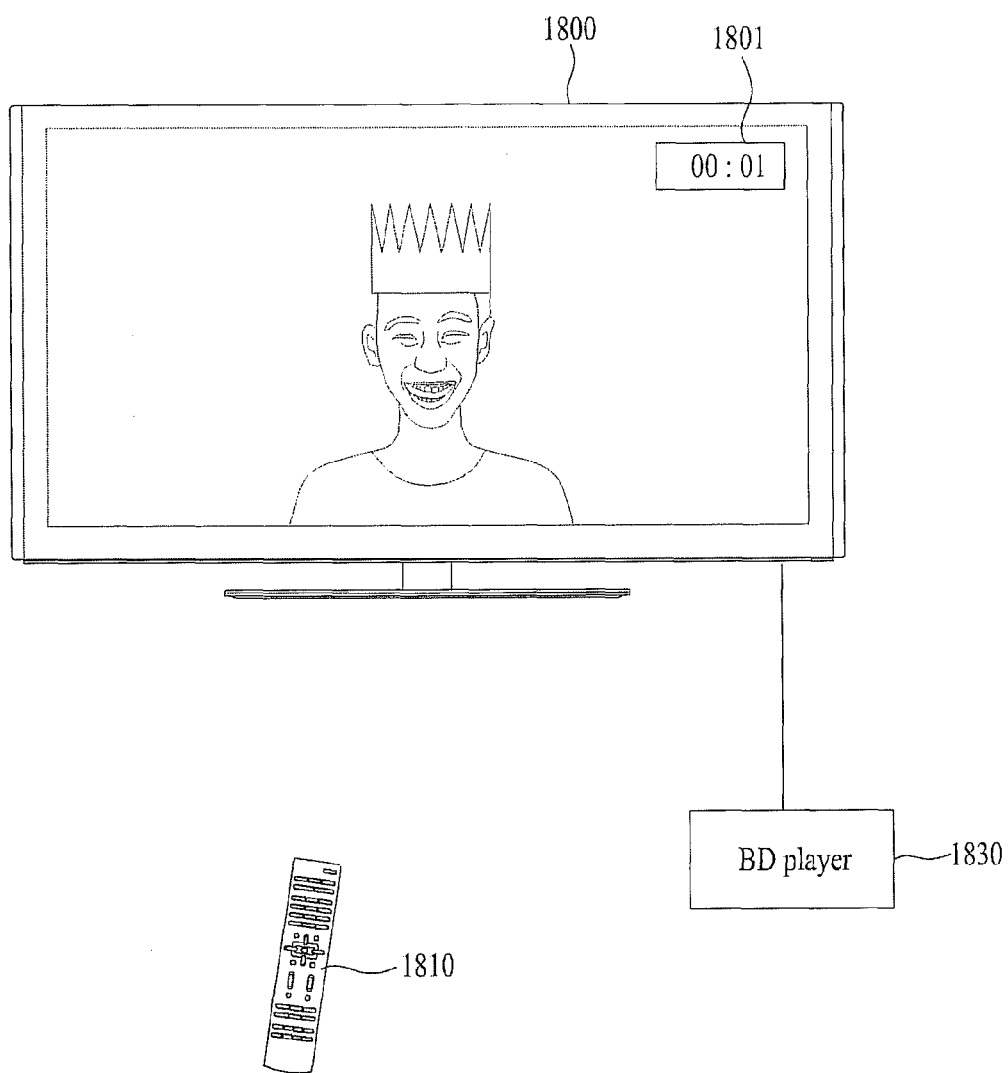

FIGS. 17 and 18 are views showing a third embodiment of controlling the external electronic device using the screen provided by the multimedia device. Hereinafter, a process of controlling a function of an external electronic device (for example, a playback function of a BD player), which is not attached to the outside of the remote controller as a local key button, will be described with reference to FIGS. 17 and 18.

First, selection of a tab 1701 displaying a BD player as a device to be controlled using the method shown in FIG. 11 is assumed. At this time, a multimedia device 1700 according to an embodiment displays an OSD regarding functions of the selected BD player, as shown in FIG. 17.

The OSD is stored in the memory of the multimedia device for each device. Functions of the OSD shown in FIG. 17 are designed in a format that can be selected by a remote controller 1710.

In a case in which a user moves the remote controller 1710 with the result that an indicator 1702 is located in a playback region of the BD player, the multimedia device 1700 transmits an IR code value corresponding to the playback function of the BD player to the remote controller 1710.

The remote controller 1710 transmits the IR code value received from the multimedia device 1700 to a corresponding electronic device, i.e. a BD player 1730.

In a case in which a playback function of a BD player 1830 is executed as shown in FIG. 18, therefore, a multimedia device 1800 connected to the BD player 1830 displays a screen 1801 playing a corresponding title. Also, it is possible to further control other functions (for example, stop, reverse, etc.) of the BD player 1830 using a remote controller 1810.

Figure 19:
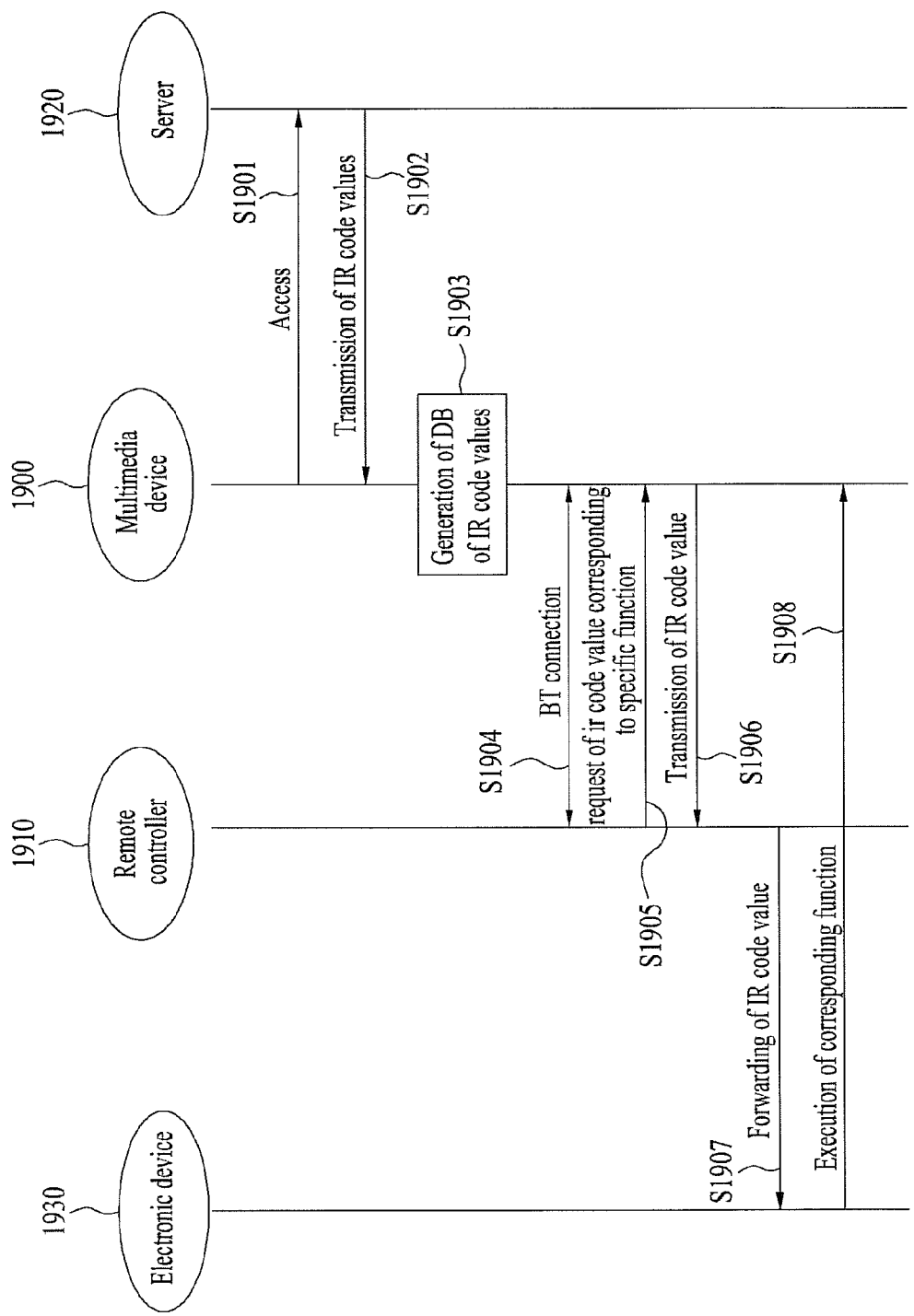
FIG. 19 is a flow chart showing the flow of data transmitted and received between the respective devices of the system shown in FIG. 1.

FIG. 19 is a flow chart showing the flow of data transmitted and received between the respective devices of the system shown in FIG. 1 in detail. Hereinafter, transmission and reception of data among a multimedia device 1900, a remote controller 1910, a server 1920, and at least one electronic device 1930 will be described with reference to FIG. 19.

The multimedia device 1900 according to one embodiment accesses to the server 1920 having IR code values (S1901). The server 1920 transmits IR code values for controlling functions of a specific electronic device to the multimedia device 1900 according to the request of the multimedia device 1900 (S1902).

The multimedia device 1900 constructs a storage for storing the IR code values received from the server 1920 (S1903). Alternatively, the IR code values may be stored in different memory addresses assigned for the respective devices as shown in FIG. 7.

The remote controller 1910 and the multimedia device 1900 are connected to each other through near field communication, such as Bluetooth (S1904). The remote controller 1910 requests an IR code value corresponding to a specific function of a specific electronic device to be controlled from the multimedia device 1900 (S1905).

The multimedia device 1900 transmits a corresponding IR code value to the remote controller 1910 according to the request of the remote controller 1910 (S1906). The remote controller 1910 forwards the received IR code value to a corresponding electronic device 1930 (S1907).

The electronic device 1930 executes a function corresponding to the IR code value (S1908). The function executed at step S1908 may be associated with, for example, a function for controlling the multimedia device 1900.

Figure 20:
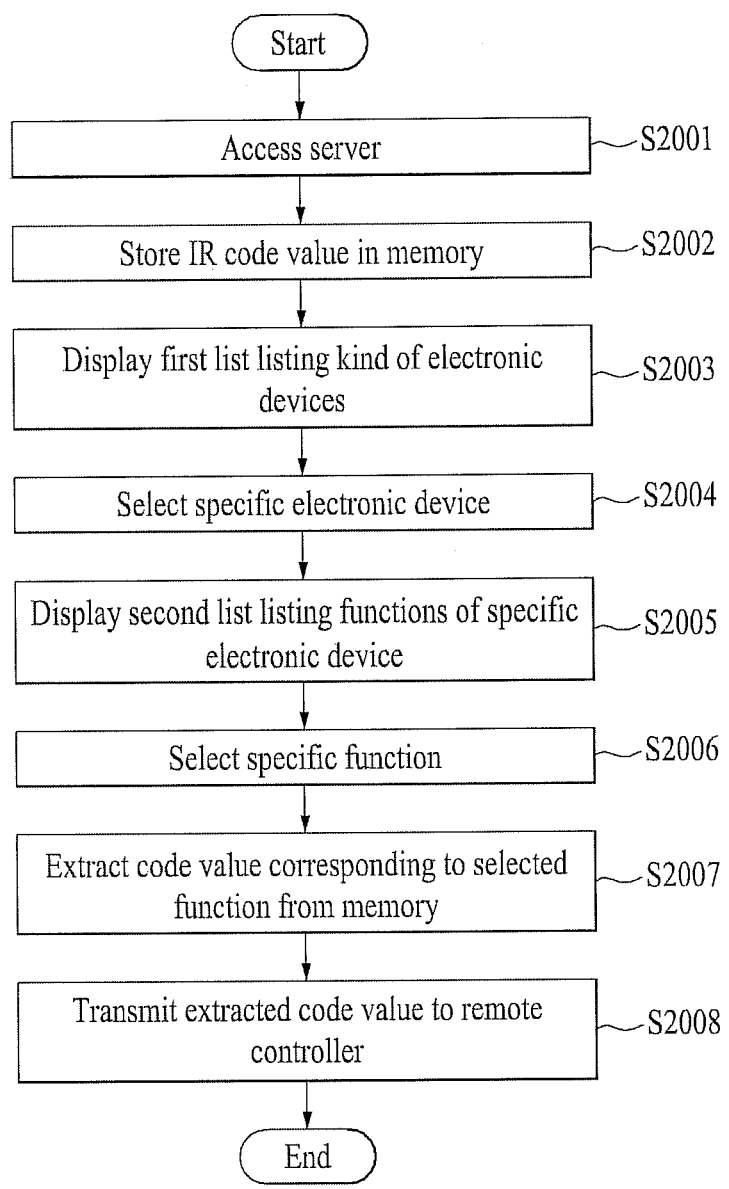
FIG. 20 is a flow chart showing a control method for a multimedia device according to one embodiment.

FIG. 20 is a flow chart showing a control method of a multimedia device according to one embodiment. In this embodiment, the multimedia device having data communication with a remote controller through a first communication path is connected to a server through a network interface unit (S2001). The multimedia device stores a code value received from the server, to which the multimedia device is connected, in the memory (S2002). The code value corresponds to, for example, a specific function of a specific electronic device. The code value is designed to be transmitted through a second communication path.

The multimedia device displays a first list listing kinds of one or more electronic devices (S2003). The multimedia device receives a signal for selecting a specific electronic device through the first communication path (S2004).

The multimedia device displays a second list listing functions of the selected electronic device (S2005). The multimedia device receives a signal for selecting a specific function of the selected electronic device through the first communication path (S2006).

The multimedia device extracts a code value corresponding to the selected function of the electronic device from the memory (S2007). The multimedia device transmits the extracted code value to the remote controller through the first communication path (S2008).

Step S2001 is designed to update the code value, for example, periodically or according to user request.

Step S2002 includes, for example, a step of storing at least one code value related to a function of a first electronic device in a first address of the memory and a step of storing at least one code value related to a function of a second electronic device in a second address of the memory.

Step S2003 and step S2005 include, for example, a step of an on screen display (OSD) generation unit generating the first list and the second list based on data stored in the memory.

Step S2004 and step S2006 are designed, for example, so that the specific electronic device or the specific function can be selected based on a position sensor of the remote controller. The position sensor may include, for example, a gyro sensor and/or an acceleration sensor.

Figure 21:
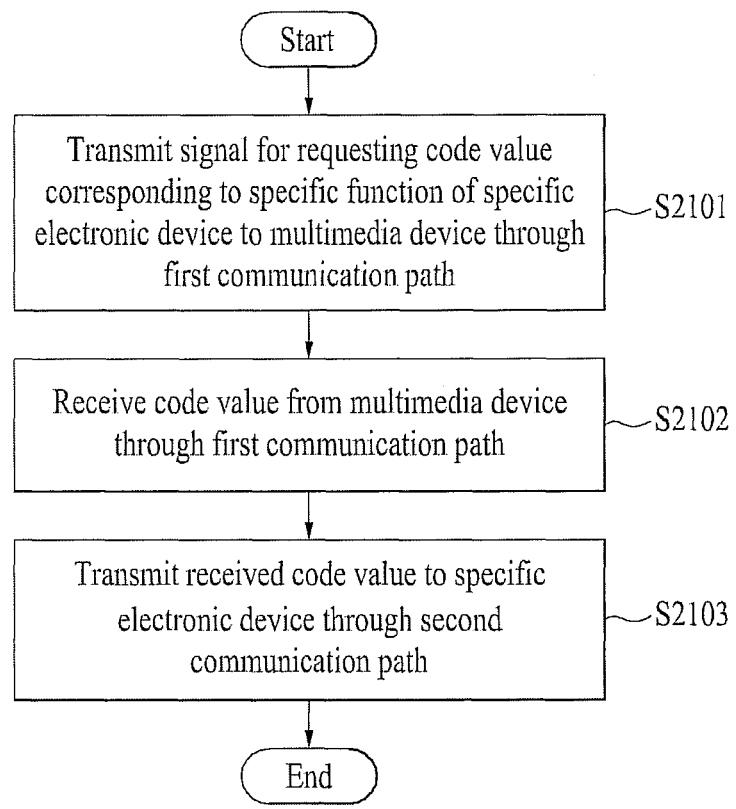
FIG. 21 is a flow chart showing a control method for a remote controller according to one embodiment.

FIG. 21 is a flow chart showing a control method of a remote controller according to one embodiment. In this embodiment, the remote controller having data communication with a multimedia device or a specific electronic device transmits a signal for requesting a code value corresponding to a specific function of a specific electronic device to be controlled by the remote controller to the multimedia device (S2101). Step S2101 is designed so that step S2101 can be carried out, for example, by the RF module 514a shown in FIG. 5.

The remote controller receives a code value corresponding to the specific function of the specific electronic device from the multimedia device (S2102). Step S2102 is designed so that step S2102 can be carried out, for example, by the RF module 514a shown in FIG. 5.

The remote controller transmits the received code value to the specific electronic device (S2103). Step S2103 is designed so that step S2102 can be carried out, for example, by the IR module 514b shown in FIG. 5. In addition, the first communication and the second communication are designed to employ different communication protocols.

The RF module 514a is designed, for example, to primarily transmit a signal for selecting the specific electronic device from among a plurality of electronic devices and to secondarily transmit a signal for requesting a code value corresponding to the specific function among a plurality of functions provided by the selected specific electronic device.

Meanwhile, the above-mentioned remote controller further includes a position sensor configured so that the position of the pointer in the screen of the multimedia device can be changed according to the motion of the remote controller as shown in FIG. 5. The position sensor may include, for example, a gyro sensor and/or an acceleration sensor.

In addition, as shown in FIGS. 2, 3, 6, and 7, the above-mentioned multimedia device includes a memory for storing a code value necessary to control at least one electronic device and a network interface module for communicating with the server to update the stored code value.

More specifically, the first communication is set to employ a Bluetooth communication protocol, and the second communication is set to employ an IR communication protocol.

Figure 22:
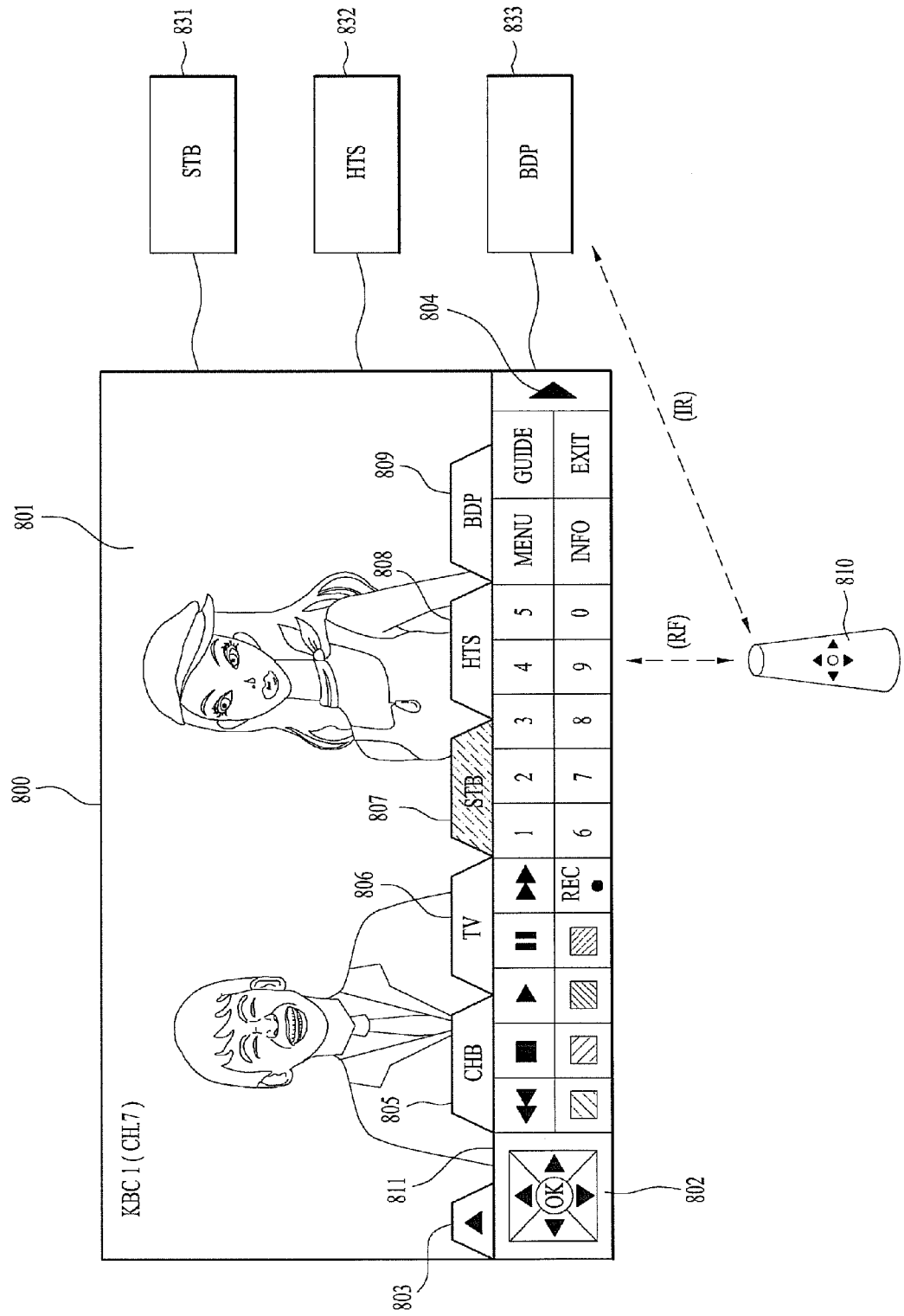
FIG. 22 is a diagram illustrating a process of controlling at least one external electronic device using a remote controller of a multimedia device according to an embodiment of the present invention.

FIG. 22 is a diagram illustrating a process of controlling at least one external electronic device using a remote controller of a multimedia device according to an embodiment of the present invention.

As shown in FIG. 22, a multimedia device 800 according to one embodiment of the present invention is connected to one or more external electronic devices, for example, a set top box (STB) 831, a home theater system (HTS) 832 and a Blu-ray disc player (BDP) 833. As described above, it is possible to control the external electronic devices, that is, the STB 831, the HTS 932 and the BDP 833, using only a remote controller 810 of the multimedia device 800, without using dedicated remote controllers of the STB 831, the HTS 932 and the BDP 833.

First, the multimedia device 800 may receive IR code values necessary to construct a database, from a server using identification of connected electronic devices. More detailed solutions will be described below with reference to FIGS. 23, 31 and 32.

If the multimedia device 800 receives a signal for requesting an OSD for a universal remote controller from the remote controller 810 according to one embodiment of the present invention while outputting a live broadcast screen 801, a corresponding OSD 811 is displayed.

Using the OSD 811 shown in FIG. 22, the remote controller 810 of the multimedia device 800 may control the external STB 831, HTS 832 and BDP 833.

The OSD 811 shown in FIG. 8 is a graphic image generated by the multimedia device 800 using IR code values received from an external server and information about mapped functions of the electronic devices. For example, the OSD 811 includes tabs for a basic channel browser (CHB) 805 and a TV function (806) and displays information about the electronic devices 807, 808 and 809 connected to the multimedia device and having IR code values constructed as a database in the form of selectable tabs. In FIG. 22, assume that the STB 831 is selected as an external electronic device to be controlled using the universal remote controller 810. That is, the tab corresponding to the STB is highlighted to notify a user of a device which may be currently controlled by the remote controller 810.

The OSD 811 shown in FIG. 22 includes a graphic option 802 having a four-way arrow shape. As described above, the remote controller 810 according to the embodiment of the present invention may be designed to change the location of an indicator, for example, according to motion of the remote controller 810. The graphic option 802 may be added in consideration of the case in which it is difficult to select a graphic image option received from an external electronic device, not a graphic OSD 811 generated by the multimedia device 800. This will be described in detail below with reference to FIGS. 26 and 27.

Further, the OSD 811 shown in FIG. 22 further includes direction tabs 803 and 804 for changing a position and content, which will be described in detail below with reference to FIGS. 28 to 30.

The OSD 811 shown in FIG. 22 includes a graphic image option for controlling the function of the STB 831 which is a specific electronic device among the connected electronic devices and the options are mapped to IR code values.

Accordingly, if a graphic image option corresponding to a specific function (e.g., number 1 or number 7) is selected using the remote controller 810, the multimedia device 800 transmits a corresponding IR code value to the remote controller 810 through RF communication and the remote controller 810 which receives the IR code value transmits the IR code value to the STB 831 so as to execute the function (e.g., tuning to channel 1 or tuning to channel 7).

Further, according to another embodiment of the present invention, a first control region for selecting a graphic option received from an arbitrary electronic device and a second control region for selecting a graphic option generated by the multimedia device are simultaneously displayed. The second control region corresponds to the OSD 811 shown in FIG. 22, for example.

The first control region means image data which is not autonomously generated by the multimedia device. For example, options in a menu region 1202 transmitted by the STB shown in FIG. 26 or a channel browse region 1301 shown in FIG. 27 cannot be selected using only motion of the remote controller. If only a specific region cannot be selected using the remote controller, a user may mistakenly believe that errors have occurred. Accordingly, in order to solve such a problem, the graphic image 802 having the four-way arrow shape shown in FIG. 22 is added.

Figure 23:
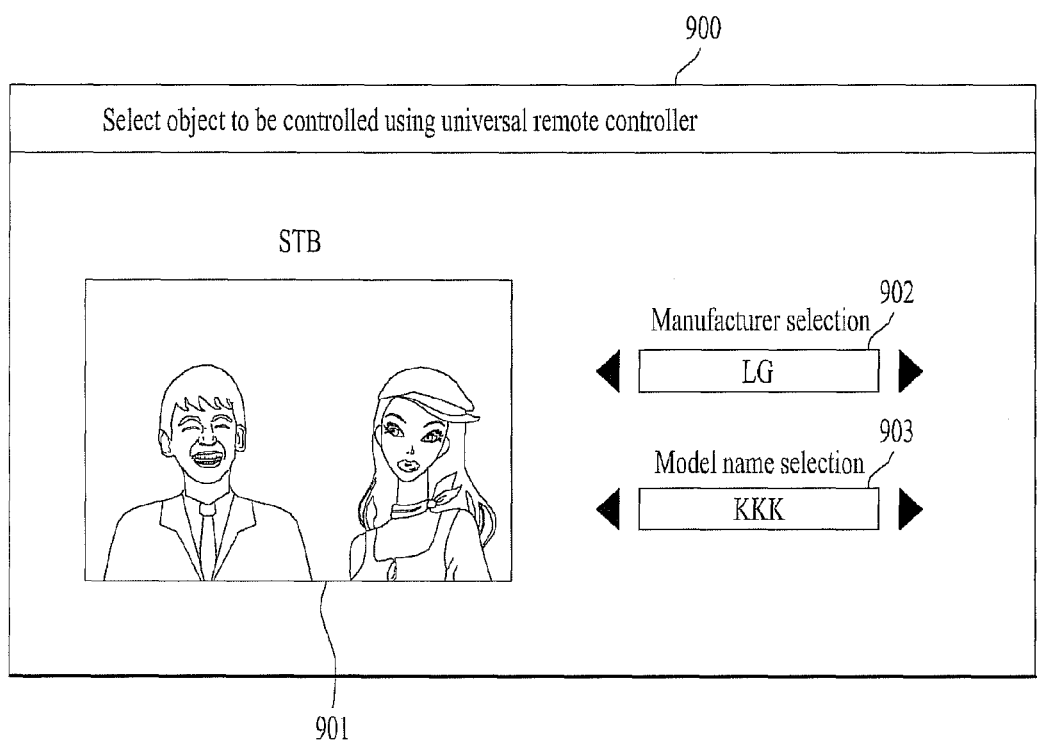
FIG. 23 is a diagram illustrating a process of selecting an external electronic device to be controlled using a universal remote controller according to an embodiment of the present invention.

FIG. 23 is a diagram illustrating a process of selecting an external electronic device to be controlled using a universal remote controller according to an embodiment of the present invention.

As described above, it is possible to control an arbitrary electronic device connected to a multimedia device using a remote controller according to one embodiment of the present invention. The multimedia device must recognize information about connected electronic devices in order to receive a list of corresponding IR code values.

As shown in FIG. 23, the multimedia device 900 according to one embodiment of the present invention displays an OSD for inputting information about an electronic device to be controlled by the remote controller.

For example, the multimedia device is designed to output an option 902 for selecting a manufacturer of a connected STB and an option 903 for selecting a product model name of the connected STB. The multimedia device is designed such that such an OSD is displayed in consideration of a possibility in which different IR code values are used on a per manufacturer basis or on a per product model name basis.

Further, as shown in FIG. 23, the multimedia device is designed to additionally display video data 901 which is currently being output from a connected external electronic device, thereby preventing a user mistake and confusion from occurring. A detailed process of enabling a user to directly input information about an external electronic device using the OSD shown in FIG. 23 will be described in greater detail below with reference to FIG. 31.

Although a user selects information about an external electronic device in FIG. 23, a solution for automatically detecting the information will be described below with reference to FIG. 32.

Figure 24:
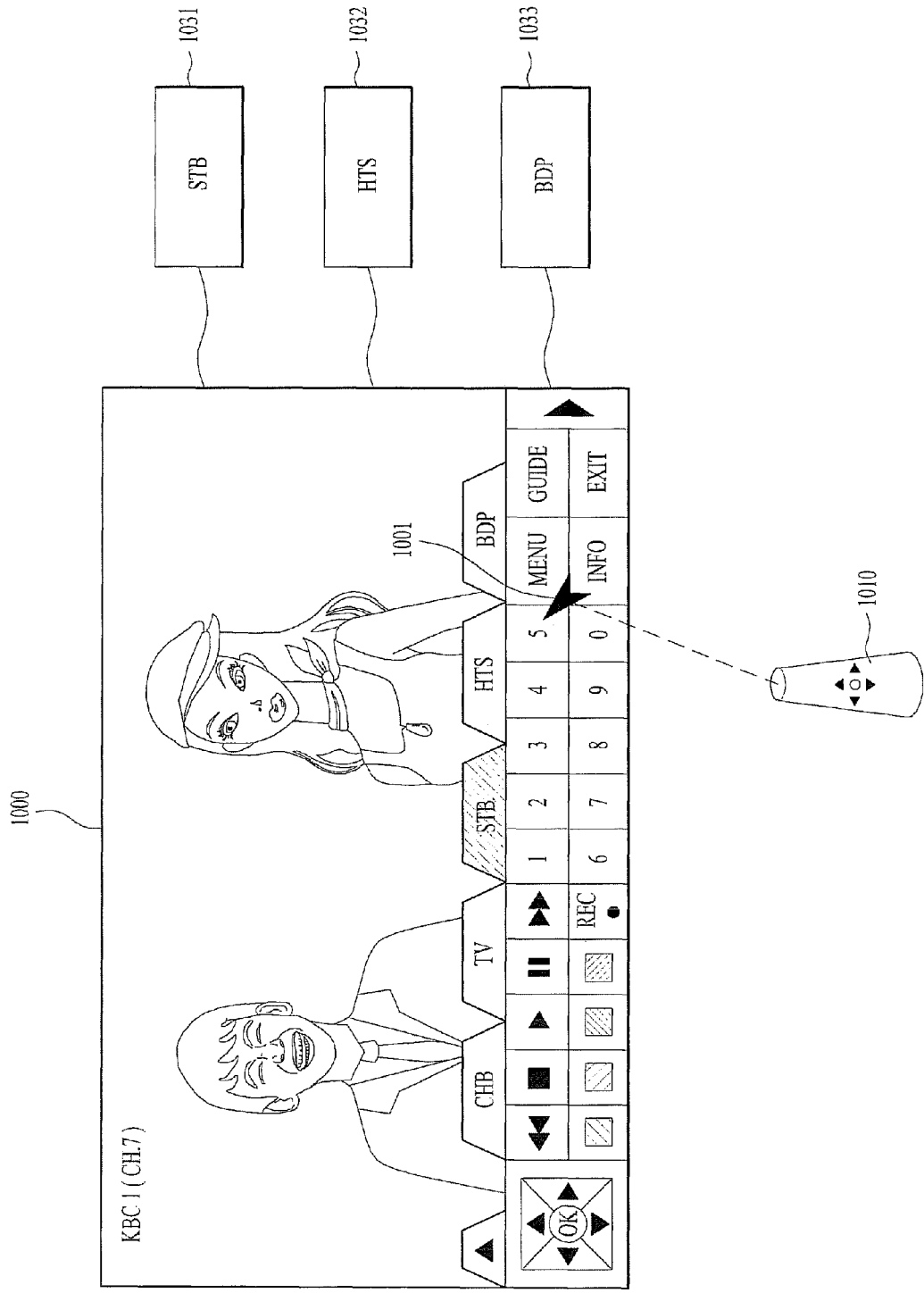
FIG. 24 is a diagram showing an example of an indicator displayed on a screen of a multimedia device according to the position of a universal remote controller according to an embodiment of the present invention.

FIG. 24 is a diagram showing an example of an indicator displayed on a screen of a multimedia device according to the position of a universal remote controller according to an embodiment of the present invention. Referring to FIG. 24, an example of an indicator displayed on a screen of a multimedia device according to the position of a universal remote controller according to one embodiment of the present invention will be described. FIG. 24 may be supplementarily interpreted with reference to the description of FIG. 22.

As shown in FIG. 24, the multimedia device 1000 is connected to external electronic devices such as an STB 1031, a HTS 1032 and a BDP 1033.

The remote controller 1010 according to one embodiment of the present invention includes a position sensor for sensing the position, direction, speed, etc. of the remote controller 1010 controlled by the user as described above.

An indicator which is changed according to motion of the remote controller 1010 is displayed on the screen of the multimedia device 1000. Accordingly, the user may select an image option for controlling a specific function of an external electronic device using the remote controller 1010.

Figure 25:
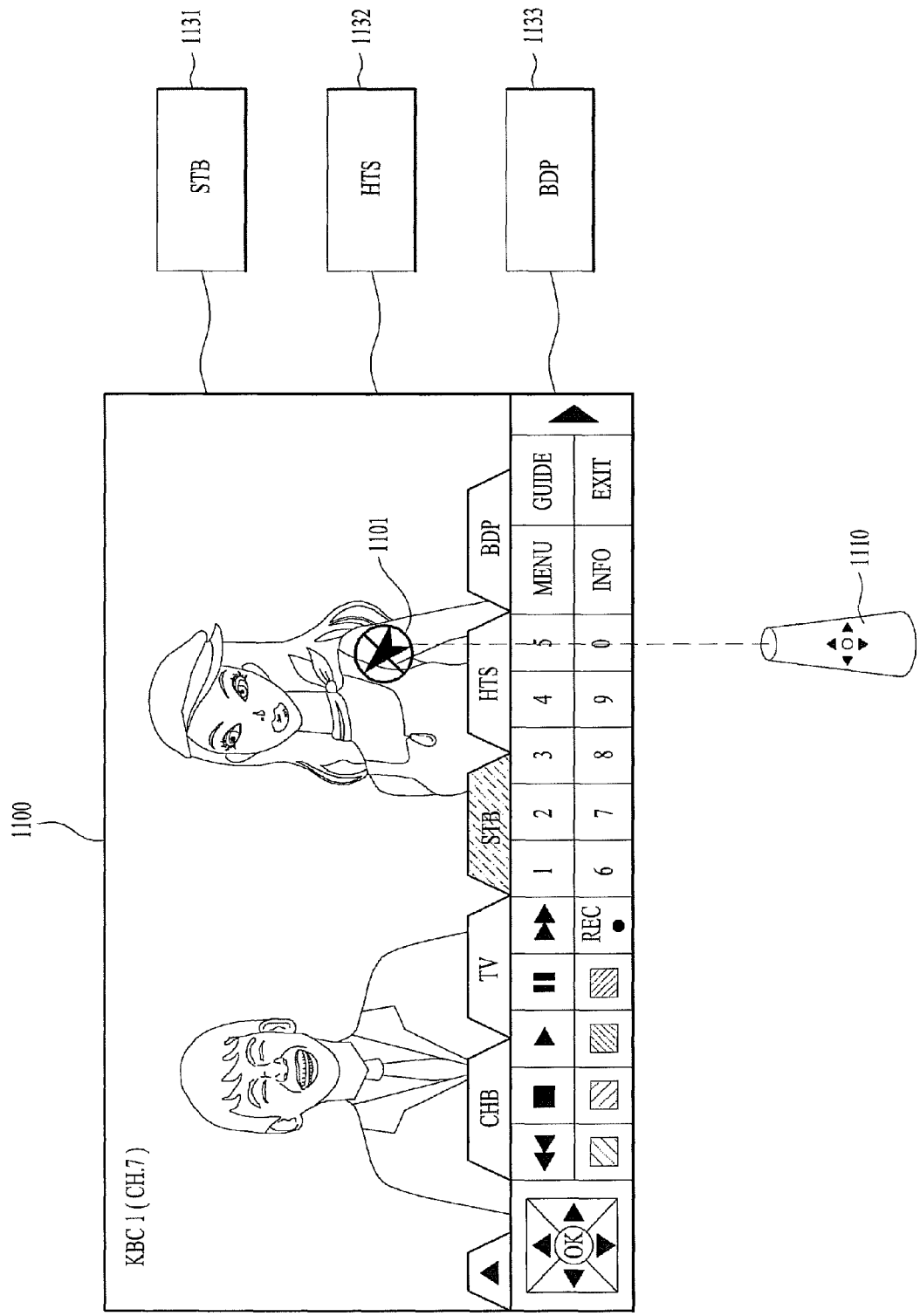
FIG. 25 is a diagram showing another example of an indicator displayed on a screen of a multimedia device according to the position of a universal remote controller according to an embodiment of the present invention.

FIG. 25 is a diagram showing another example of an indicator displayed on a screen of a multimedia device according to the position of a universal remote controller according to an embodiment of the present invention. Referring to FIG. 25, another example of an indicator displayed on a screen of a multimedia device according to the position of a universal remote controller according to one embodiment of the present invention will be described. FIG. 25 may be supplementarily interpreted with reference to the description of FIGS. 22 and 24.

As shown in FIG. 25, assume that the multimedia device 1100 is connected to external electronic devices such as an STB 1131, a HTS 1132 and a BDP 1133.

Any one of transparency, shape or color of an indicator 1101 shown in FIG. 25 is designed to be different that of the indicator 1001 shown in FIG. 24. That is, if the indicator 1101 deviates from a graphic image region for controlling the functions of the external electronic devices, the indicator is designed to be changed to an indicator different from the indicator 1001 shown in FIG. 24. Therefore, the universal remote controller 1110 is guided into the region for controlling the external electronic device.

Figure 26:
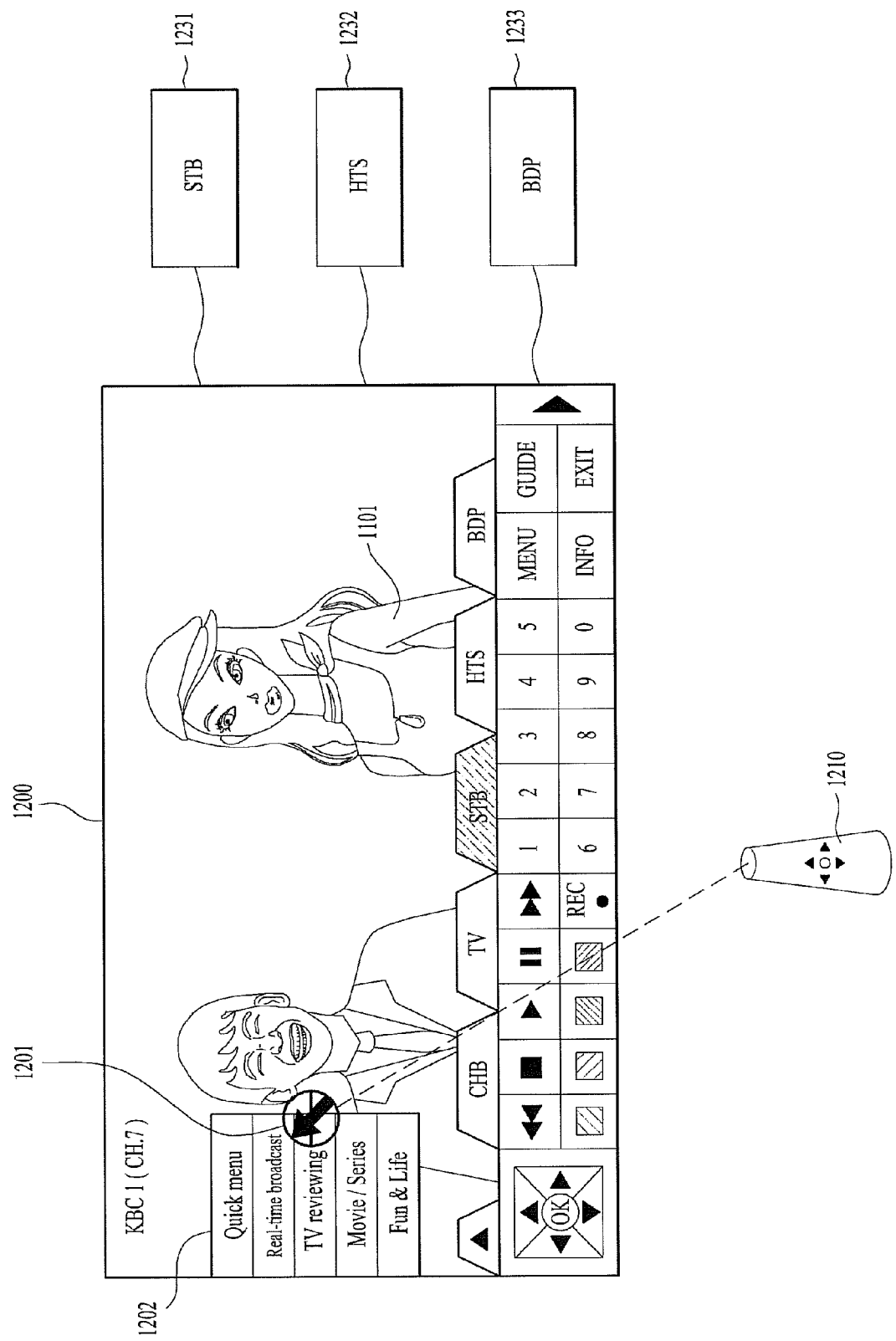
FIG. 26 is a diagram showing an example of a graphic image option received from an external electronic device.

FIG. 26 is a diagram showing an example of a graphic image option received from an external electronic device.

As shown in FIG. 26, assume that a multimedia device 1200 according to one embodiment of the present invention is connected to an STB 1231, a HTS 1232 and a BDP 1233 and a mode for controlling the STB 1231 is selected. For example, assume that a tab 807 for controlling the STB shown in FIG. 22 is selected.

Further, if a menu option is selected on the OSD for the universal remote controller shown in FIG. 26, a graphic image 1202 provided by the STB 1231 is displayed.

As described above, on the OSD graphic image for the universal remote controller generated by the multimedia device, the position of the remote controller 1210 and the corresponding indicator may be moved to select a desired option.

In contrast, selectable items (e.g., real-time broadcast, TV reviewing, movie/series, fun & life, etc.) provided on the graphic image option 1202 by the STB 1231 cannot be selected by directly positioning the indicator 1201 corresponding to motion of the remote controller 1210, because the multimedia device 1200 cannot previously recognize the graphic image 1202 provided by the STB 1231 unlike the OSD for the universal remote controller.

Accordingly, if a remote controller dedicated to the STB 1231 is separately used in this situation, a data processing speed is decreased, thereby leading to user inconvenience. As a first solution to solve such problems, the shape of the indicator 1201 is changed in a region which cannot be directly selected by the indicator 1201. For example, as shown in FIG. 26, a straight line graphic may appear to cover the middle of an arrow.

Further, as a second solution, the indicator 1201 is positioned on the four-way arrow button part 802 shown in FIG. 22 so as to readily select options of the menu image 1202 provided by the STB 1231. A detailed process thereof will be described below with reference to FIG. 27.

Figure 27:
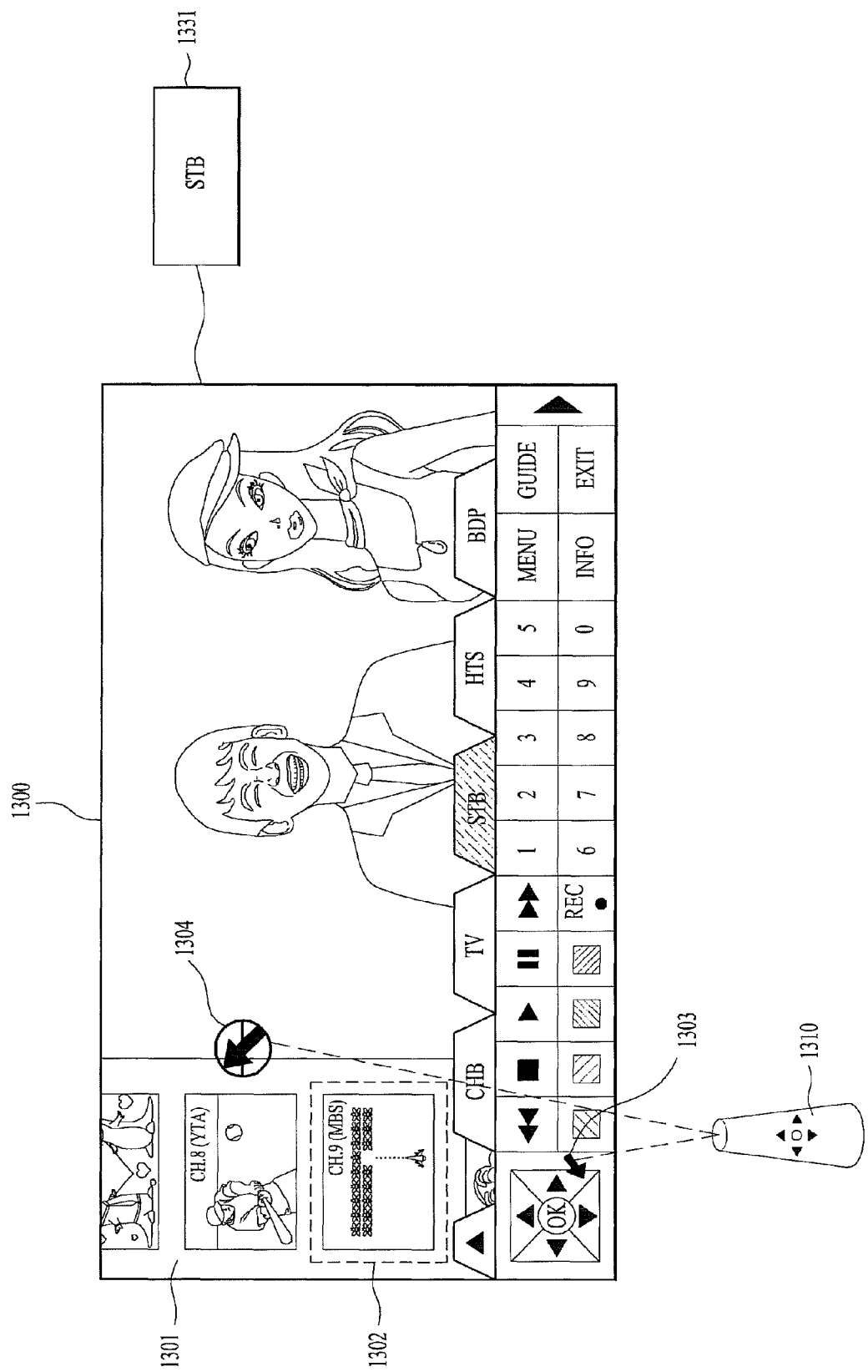
FIG. 27 is a diagram illustrating a process of selecting a graphic image option received from an external electronic device.

FIG. 27 is a diagram illustrating a process of selecting a graphic image option received from an external electronic device.

A multimedia device 1300 which has output a general broadcast screen displays a graphic image 1301 related to a channel browser provided by the STB 1331. If the multimedia device 1300 processes and outputs the graphic image 1301 related to the channel browser, a desired channel may be selected by moving the remote controller 1301. The channel browser shown in FIG. 27 includes at least one of a per-channel thumbnail image, channel information and program information.

However, as described above with reference to FIG. 26, if the graphic image related to the channel browser is directly received from an external electronic device, e.g., the STB 1331 and is then output, an indicator 1304, the position of which is changed according to motion of the remote controller 1310, cannot be located in a corresponding region and cannot be directly selected. At this time, in order to notify a user that no error has occurred, the shape, color and transparency of the indicator 1304 is changed.

Accordingly, if a specific channel 1302 is selected in the channel browser image 1301 using the remote controller 1310 corresponding to the multimedia device 1300 instead of a remote controller dedicated to the STB 1331, the indicator 1303 is positioned on the four-way arrow image.

For example, if a specific direction is selected using the remote controller 1310, an IR code value (e.g., a command for moving one step in a specific direction) corresponding thereto is sent from the multimedia device 1300 to the remote controller 1310, and the remote controller 1310 is designed to transmit the IR code value to the STB 1331.

Figure 28A:
FIGS. 28a and 28b are diagrams illustrating a process of changing the position of an OSD controlled by a universal remote controller.
Figure 28B:
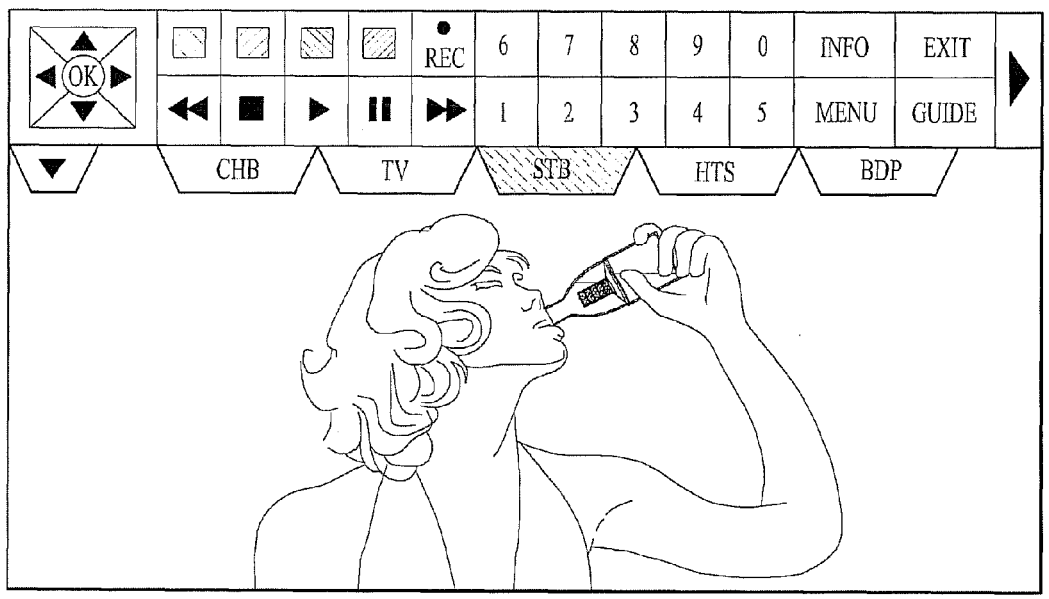

FIGS. 28 and 28b are diagrams illustrating a process of changing the position of an OSD controlled by a universal remote controller. As needed, FIGS. 28a and 28b may be supplementarily interpreted with reference to the description of the above figures.

For example, if the position of the OSD for executing the universal remote controller is desired to be changed, a tab 1401 of a specific direction shown in FIG. 28a is selected. If the tab 1401 shown in FIG. 28a is selected, as shown in FIG. 28b, the position of the OSD is changed to the uppermost end of the screen.

Figure 29A:
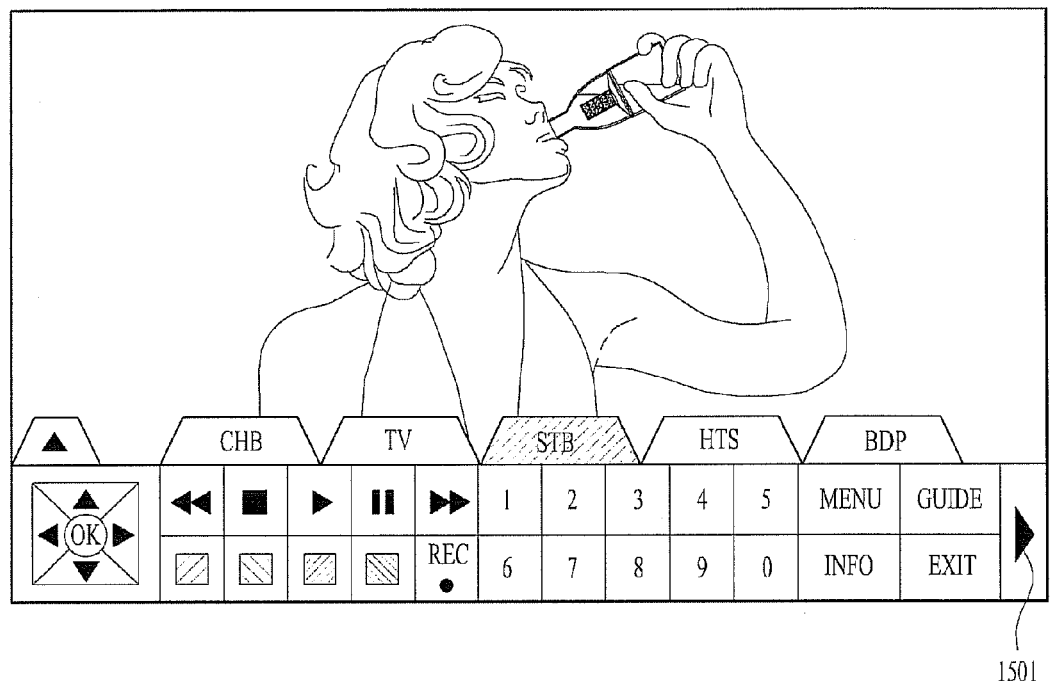
FIGS. 29a, 29b and 29c are diagrams illustrating a process of changing content of an OSD controlled by a universal remote controller.
Figure 29B:
Figure 29C:
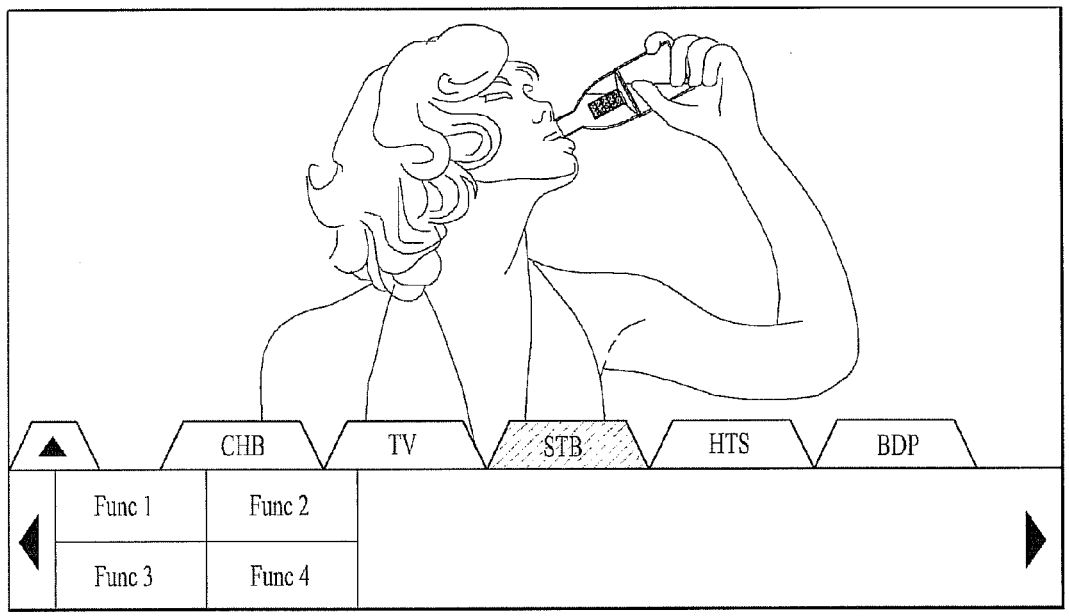

FIGS. 29a, 29b and 29c are diagrams illustrating a process of changing content of an OSD controlled by a universal remote controller. FIGS. 29a, 29b and 29c may be supplementarily interpreted with reference to the description of the above figures.

For example, if the content of an OSD for executing the universal remote controller is desired to be changed, a tab 1501 of a specific direction shown in FIG. 29b is selected. At this time, the following two embodiments may be implemented within the scope of the present invention.

In one embodiment, if the tab 1501 shown in FIG. 29a is selected, supplementary items on the OSD are changed as shown in FIG. 29b. For example, while menu (MENU), guide (GUIDE), information (INFO) and exit (EXIT) are included as the supplementary items in FIG. 29a, Func 1 to Func 4 are included as the supplementary items in FIG. 29b.

In another embodiment, if the tab 1501 shown in FIG. 29a is selected, the total page of the OSD is completely changed as shown in FIG. 29c. For example, all options such as a channel number disappear and only changed supplemental items (Func 1 to Func 4) are displayed.

While only the changed supplementary items are advantageously changed in FIG. 29b, much more supplementary items may be advantageously added in FIG. 29b.

Figure 30A:
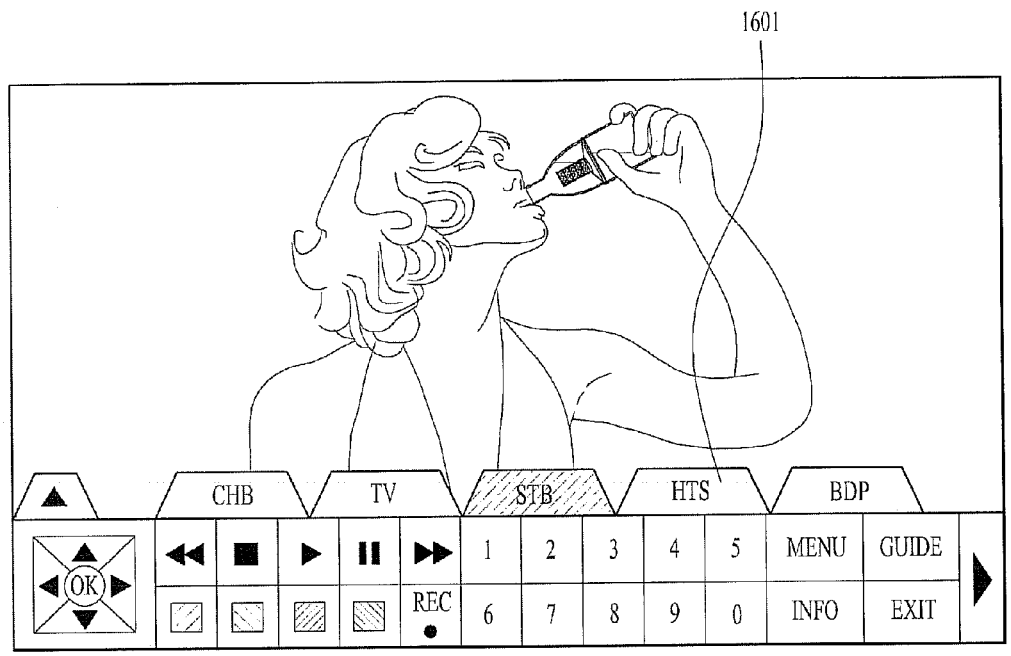
FIGS. 30a and 30b are diagrams illustrating a process of changing an external electronic device to be controlled by a universal remote controller.
Figure 30B:
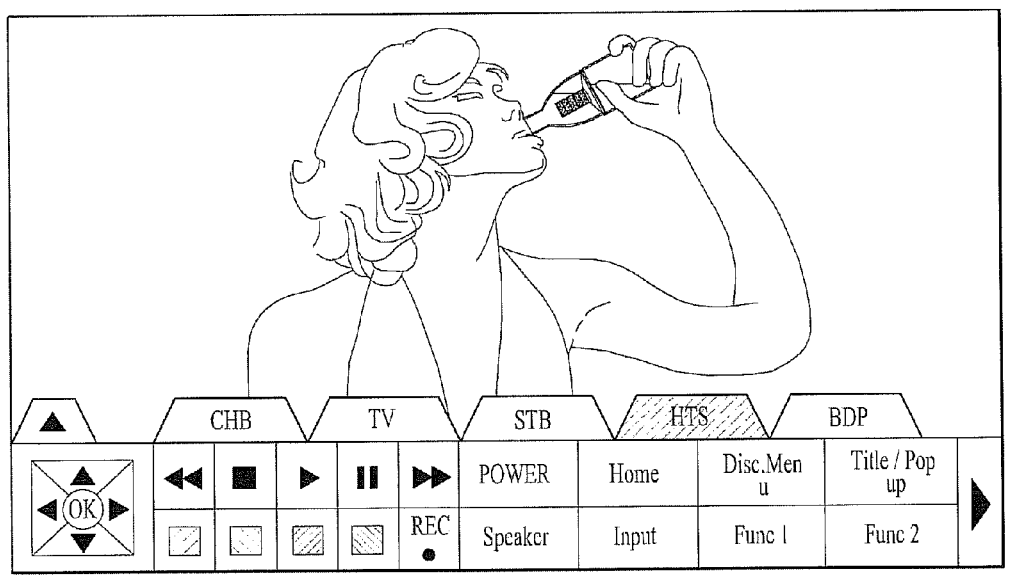

FIGS. 30a and 30b are diagrams illustrating a process of changing an external electronic device to be controlled by a universal remote controller. As needed, those skilled in the art may supplementarily interpret FIGS. 30a and 30b with reference to the description of the above figures.

For example, if an external electronic device to be controlled by a universal remote controller is desired to be changed, a specific tab 1601 shown in FIG. 30a is selected. If the tab 1601 shown in FIG. 30a is selected, the OSD is changed to an OSD for listing one or more functions provided by the HTS as shown in FIG. 30b.

Figure 31:
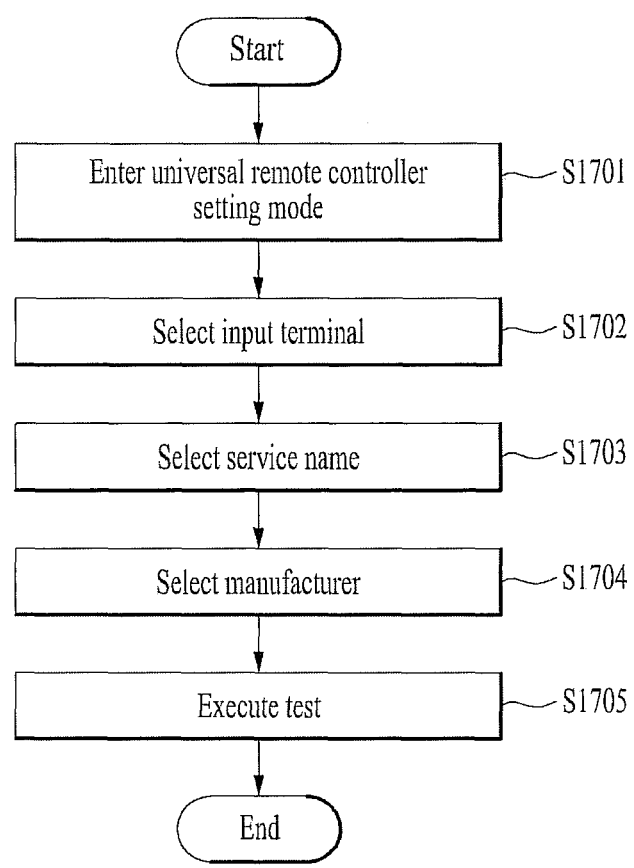
FIG. 31 is a flowchart illustrating a process of selecting an external electronic device to be controlled by a universal remote controller according to an embodiment of the present invention.

FIG. 31 is a flowchart illustrating a process of selecting an external electronic device to be controlled by a universal remote controller according to an embodiment of the present invention.

In order to implement one embodiment of the present invention, the multimedia device should know IR code values for controlling an external electronic device to be controlled or access a server to update a DB.

First, assume that the multimedia device enters a universal remote controller setting mode (S1701). For example, the universal remote controller setting mode may be implemented using the OSD shown in FIG. 23.

For example, after selecting an input terminal (e.g., HDMI) connected with an STB which is an external electronic device (1702), a service name and a manufacturer name are selected (S1703 and S1704). The service name means a service company name (e.g., QOOK or LG Plus) for providing a cable broadcast, an Internet broadcast, etc., for example, and the manufacturer name means a company name (e.g., LG, Motorola, Samsung, etc.) for manufacturing an STB, for example.

If the multimedia device does not have an IR code value for controlling an external electronic device, which is obtained through steps S1703 to S1704, the multimedia device accesses a server to update an IR code value.

If update is completed, for example, if a channel up image for testing is displayed and a user selects the displayed image using the remote controller of the multimedia device, it is possible to check whether the channel of the connected STB is changed. More specifically, for example, given normal settings, the screen 901 of the current channel shown in FIG. 9 is changed to the screen of the current channel changed by +1.

Since the process described with reference to FIG. 31 requires separate user selection, a solution for solving this problem will be described below with reference to FIG. 32.

Figure 32:
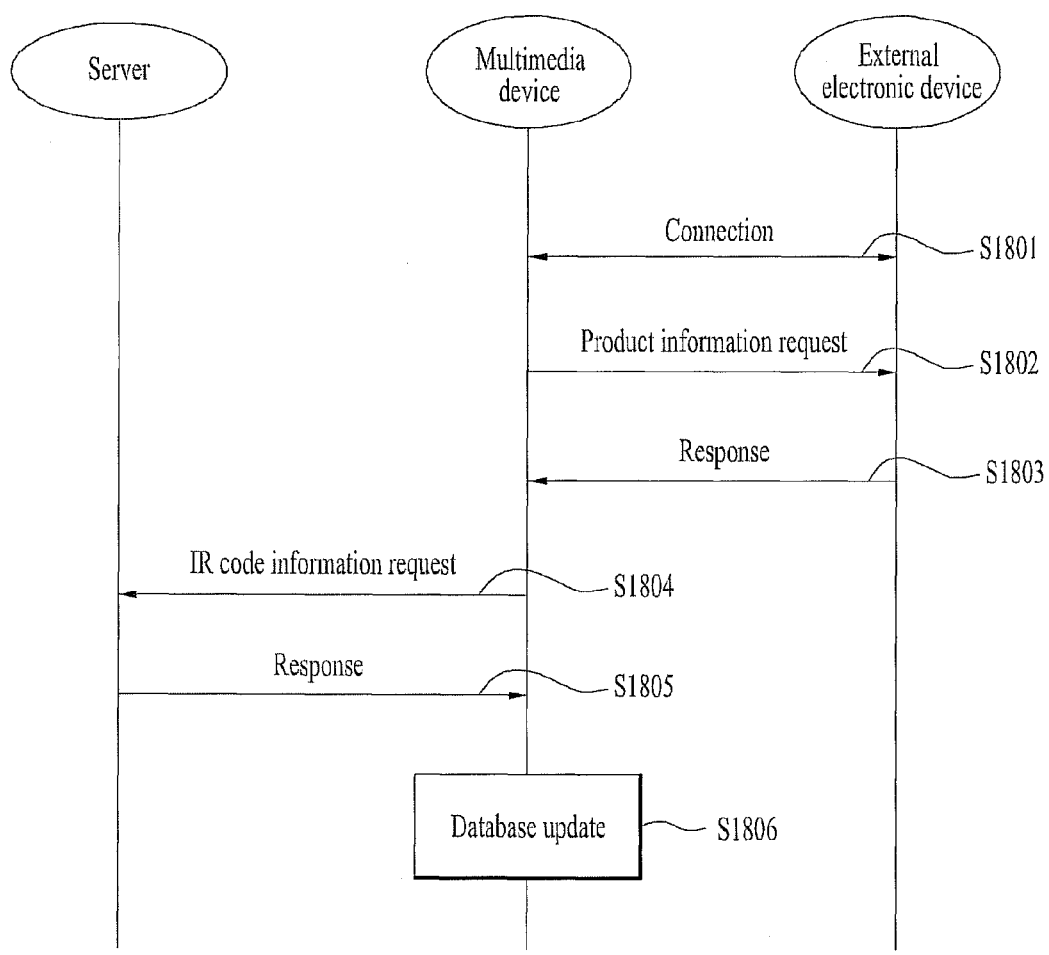
FIG. 32 is a flowchart illustrating a process of selecting an external electronic device to be controlled by a universal remote controller according to an embodiment of the present invention.

FIG. 32 is a flowchart illustrating a process of selecting an external electronic device to be controlled by a universal remote controller according to an embodiment of the present invention.

If a multimedia device according to one embodiment of the present invention and an external electronic device are connected (S1801), the multimedia device transmits a signal for requesting product information of the connected external electronic device to the connected electronic device (S1802).

Further, the electronic device transmits product information thereof to the multimedia device (S1803). The product information may include, for example, identification (ID) necessary for collecting IR code values necessary to control the functions of the electronic device.

In addition, the multimedia device requests IR code values necessary to control the functions of the identified electronic device from an external server and receives the IR code values from the external server (S1804, S1805). Finally, the multimedia device updates the database using the received IR code values (S1806). Accordingly, it is possible to control an arbitrary external electronic device using only the remote controller of the multimedia device.

Figure 33:
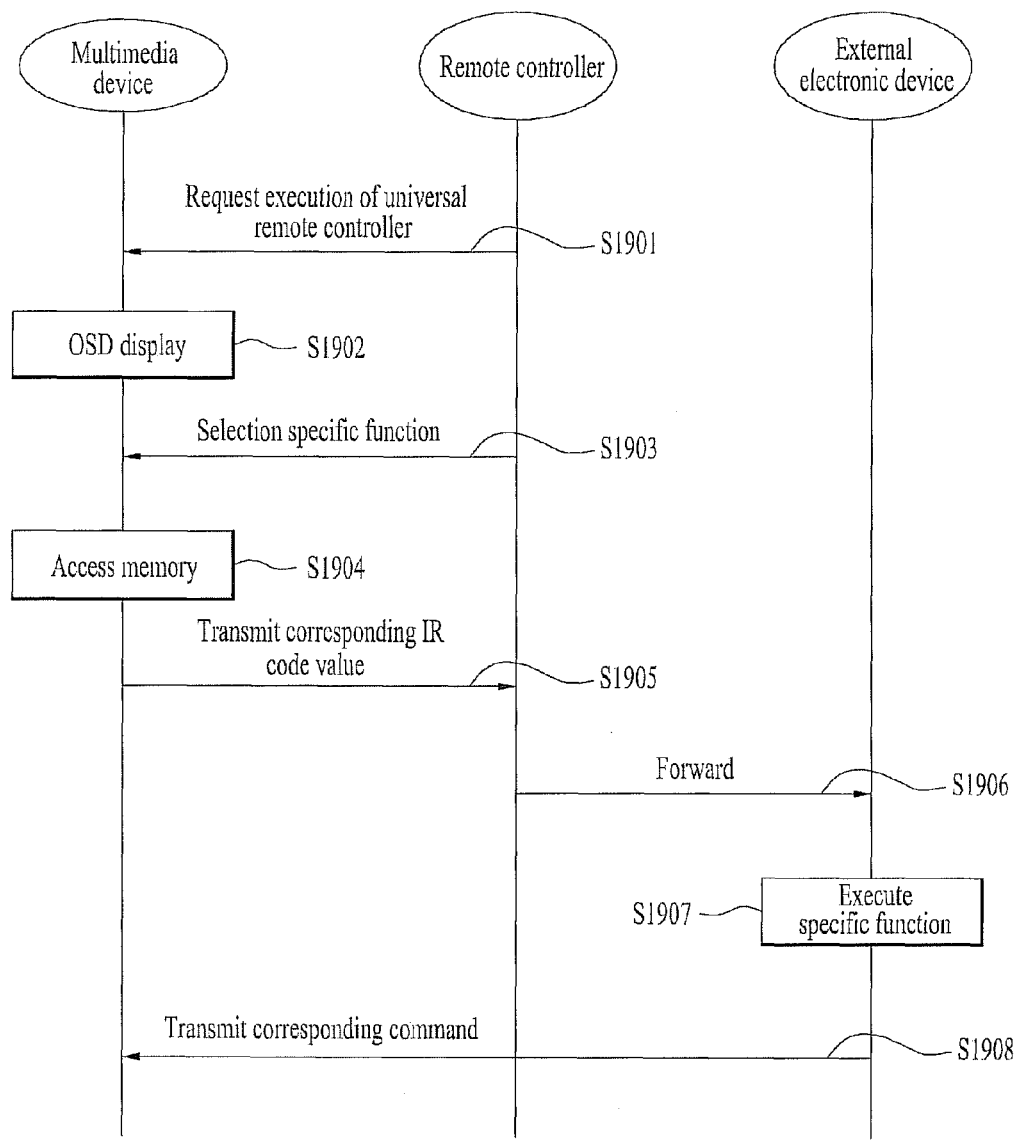
FIG. 33 is a flowchart illustrating an entire process of a system for controlling an external electronic device using a remote controller of a multimedia device according to an embodiment of the present invention.

FIG. 33 is a flowchart illustrating an entire process of a system for controlling an external electronic device using a remote controller of a multimedia device according to an embodiment of the present invention. In control of a plurality of external electronic devices, a method for controlling at least one external electronic device using only the remote controller of the multimedia device without using the remote controllers dedicated to the external electronic devices will be described.

The remote controller according to one embodiment of the present invention transmits a signal for requesting execution of the universal remote controller to the multimedia device (S1901). For example, the signal may be transmitted by pressing a shortcut key of the remote controller or without manipulation of the remote controller.

Further, the multimedia device according to one embodiment of the present invention displays an OSD related to the universal remote controller (S1902), which has been described in detail with reference to FIG. 22.

If the remote controller is moved to select a specific function from among the graphic image options displayed in step S1902 (S1903), the multimedia device accesses a memory (S1904), in order to extract an IR code value which is stored in advance or updated by accessing a server.

In addition, the multimedia device transmits an IR code value corresponding to a specific function among the functions of an external electronic device selected by the remote controller to the remote controller (S1905).

The remote controller transmits the received IR code value to the electronic device connected to the multimedia device (S1906). Accordingly, the external electronic device executes the specific function (S1907) and transmits a command corresponding thereto to the multimedia device connected to the external electronic device by wire or wirelessly (S1908).

As described with reference to FIG. 22, the user should select one tab from among tabs indicating the external electronic devices (the STB 807, the HTS 808 and the BDP 809) to be controlled. However, in this case, a user interface which decreases a data processing speed to lead to user inconvenience may be provided.

Accordingly, there is a need for a solution for automatically providing suitable OSD graphic data according to the current state of the multimedia device without a special action of a user. This will be described in detail below with reference to FIGS. 34 to 46. Of course, those skilled in the art may supplementarily interpret the embodiments of FIGS. 34 to 46 with reference to the description of the embodiments with reference to FIGS. 1 to 33.

Further, although the remote controller according to one embodiment of the present invention includes both the RF module and the IR module in FIG. 5, the scope of the present invention is not limited thereto. That is, the present invention is applicable to a remote controller including a touch sensor, a remote controller including a qwerty keyboard, or a general remote controller.

Figure 34:
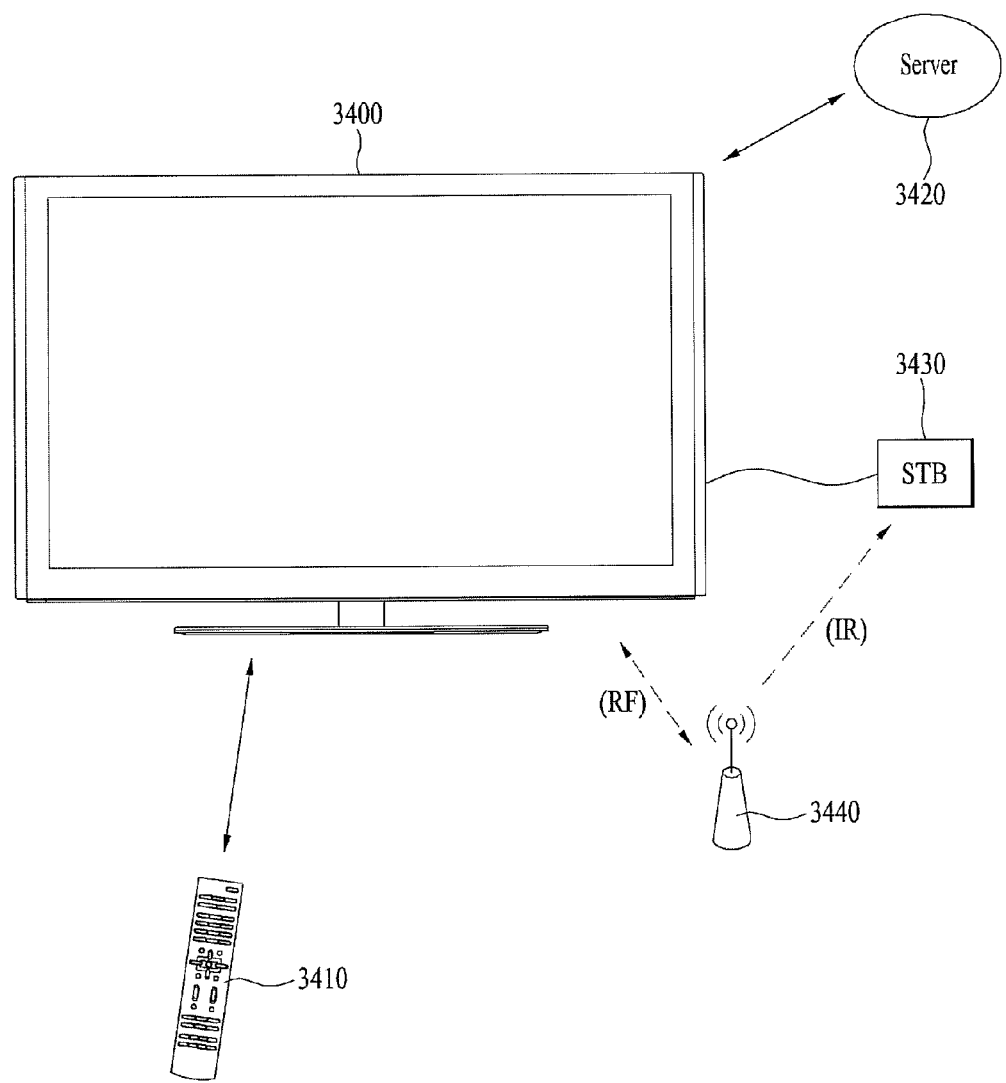
FIG. 34 is a diagram schematically showing a system including a multimedia device, a remote controller, a server and at least one electronic device according to another embodiment of the present invention.

FIG. 34 is a diagram schematically showing a system including a multimedia device, a remote controller, a server and at least one electronic device according to another embodiment of the present invention.

The remote controller including the RF module and the IR module has been described in detail with reference to FIG. 1. In contrast, in FIG. 34, a repeater 3440 is designed to perform RF communication with a multimedia device 3400 and perform IR communication with an STB 3430 which is an external electronic device. As an example of RF communication, Bluetooth may be employed.

The multimedia device 3400 receives a code value for controlling at least one external electronic device from a server 3420 and stores the code value in a memory. Of course, the multimedia device may be designed such that the code value may be directly received from the external electronic device using an HDMI scheme or may be stored in advance regardless of communication with another device.

For example, if the STB 3430 which is the external electronic device is desired to be controlled, the user selects a specific region (e.g., channel up) in the OSD graphic data using the remote controller 3410 of the multimedia device 3400. At this time, the multimedia device 3400 transmits a code value corresponding to the specific region to the repeater 3440 as an RF signal and the repeater 3440 transmits the code value to the STB 3430 as an IR signal.

The present invention is applicable not only to the system shown in FIG. 1 but also the system shown in FIG. 34.

As described above, the user should select an external electronic device to be controlled or functions which are not desired by the user are also included in the OSD graphic data of the previous figures (e.g., FIG. 22). For example, even when only numbers are input for payment of a pay VOD service, screen visibility may deteriorate if matters related to channel up/down and volume up/down are included in the OSD graphic data.

Accordingly, the multimedia device according to another embodiment is designed to have a function for recognizing a string on a screen. Accordingly, it is possible to automatically provide OSD graphic data including necessary items to the user according to circumstances.

Figure 35:
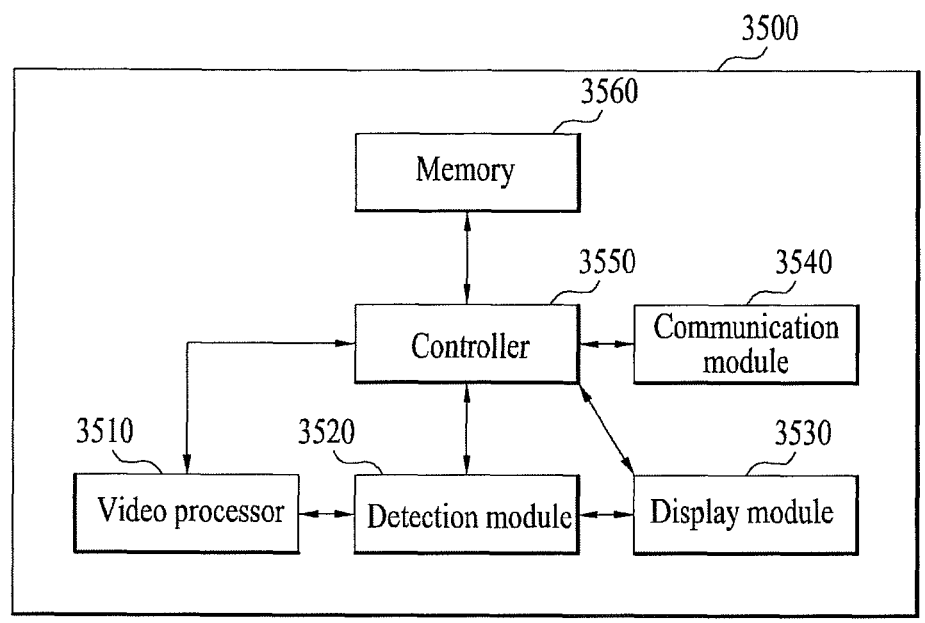
FIG. 35 is a block diagram showing internal modules of a multimedia device according to another embodiment of the present invention in detail.

FIG. 35 is a block diagram showing internal modules of a multimedia device according to another embodiment of the present invention in detail. Hereinafter, a solution for automatically outputting OSD graphic data suitable for a video image output on a screen at a multimedia device according to another embodiment of the present invention will be described with reference to FIG. 35.

The multimedia device 3500 shown in FIG. 35 includes a video processor 3510, a detection module 3520, a display module 3530, a communication module 3540, a controller 3550 and a memory 3560. As needed, another module may be added or some modules shown in FIG. 35 may be omitted.

The multimedia device 3500 is, for example, connected to an external electronic device (e.g., an STB, etc.) as shown in FIG. 1 or 34.

The memory 3560 stores at least one string and OSD graphic data corresponding thereto. The database constructed by the memory 3560 will be described in detail below with reference to FIGS. 37 and 38.

The video processor 3510 processes the video image received from the external electronic device and the detection module 3520 detects the string from the video image. Details of the internal processor of the detection module 3520 will be described in detail below with reference to FIG. 36 and embodiments thereof will be described in detail with reference to FIGS. 39 to 44.

The controller 3550 accesses the memory 3560 to extract the OSD graphic data corresponding to the detected string.

Further, the display module 3530 outputs the extracted OSD graphic data on the screen. The OSD graphic data is divided into one or more regions, which will be described below with reference to FIGS. 40, 42 and 44.

If a specific region in the OSD graphic data is selected, the communication module 3540 transmits a command signal corresponding to the specific region to the external electronic device or the remote controller. That is, while the command signal is transmitted to the remote controller in the system shown in FIG. 1, the command signal is transmitted to the repeater 3440 in the system shown in FIG. 34.

The detection module 3520 according to another embodiment of the present invention is designed to detect a string when satisfying a first condition or a second condition. If the string detection process is continuously performed, overload may be applied to the multimedia device. Accordingly the detection module 3520 is designed to operate under a specific condition, thereby preventing unnecessary data processing.

The first condition corresponds to the case in which the video image includes a popup image and the second condition corresponds to the case in which the multimedia device executes a specific function (e.g., a VOD service mode).

Further, the detection module 3520 is designed by an optical character recognition tool, which falls within the scope of the present invention.

Although not shown in FIG. 35, as described above with reference to FIG. 1, the multimedia device 3500 further includes a network interface for receiving a code value corresponding to each region in the OSD graphic data from a server.

Figure 36:
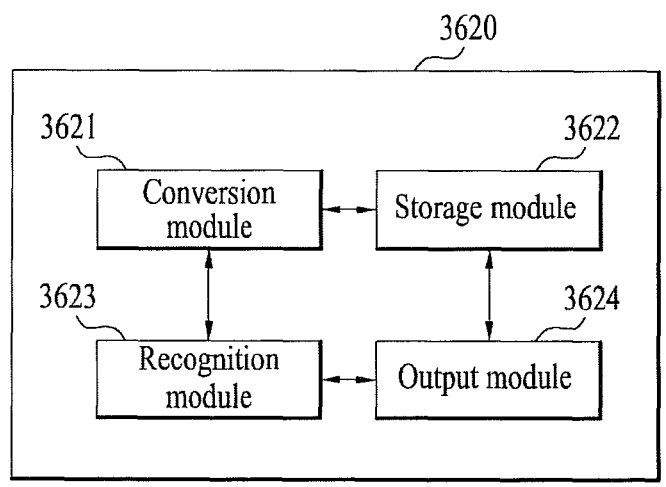
FIG. 36 is a block diagram showing a detection module 3520 shown in FIG. 25 in detail.

FIG. 36 is a block diagram showing the detection module 3520 shown in FIG. 25 in detail. Hereinafter, the detection module 3520 for recognizing a string in a video image output on the screen of the multimedia device will be described in greater detail with reference to FIG. 36. The string is not limited to letters and includes, for example, numbers, colors or indicators having specific shapes.

As shown in FIG. 36, the detection module 3620 for recognizing the string includes a conversion module 3621, a storage module 3622, a recognition module 3623 and an output module 3624. The modules shown in FIG. 36 are intended to illustrate the embodiment of the present invention and the scope of the present invention is defined by claims. Accordingly, the string may be recognized using a tool different from the modules shown in FIG. 36, which falls within the scope of the present invention.

The conversion module 3621 converts the string output on the screen of the multimedia device into a voltage waveform. At this time, the shape of the string which is a two-dimensional figure is converted into a one-dimensional signal, which is time-series change of a voltage waveform, using a scanning operation.

The storage module 3622 stores an arithmetic and control program (SW program) for controlling the recognition module 3623 and data representing a recognized shape in a specific form.

The recognition module 3623 processes an unknown string received from the conversion module 3621 under control of the program stored in the storage module 3622, compares the unknown string with a standard pattern stored in the storage module 3622, and recognizes a string corresponding to a best matching pattern.

The output module 3624 sends the recognized string to the controller 3550 shown in FIG. 35. Accordingly, the controller 3550 may access the memory 3560 to extract a specific type of OSD graphic data corresponding to the recognized string.

The database stored in the memory 3560 will be described with reference to FIGS. 37 and 38.

FIG. 37 is a diagram showing an example of a database stored in the memory 3560 shown in FIG. 35. Hereinafter, a relationship between a string and corresponding OSD graphic data stored in the multimedia device according to another embodiment of the present invention will be described with reference to FIG. 37.

OSD graphic data corresponding to a specific string in a video image output on the screen of the multimedia device is designed to be mapped as shown in FIG. 37. The method of recognizing the specific string in the video image has been described with reference to FIGS. 35 and 36 and thus will be omitted herein.

As shown in FIG. 37, for example, if a string A is included in the video image, OSD graphic data of a type a is automatically retrieved. If a string B is included in the video image, OSD graphic data of a type b is automatically retrieved. If a string C is included in the video image, OSD graphic data of a type c is automatically retrieved. In particular, the OSD graphic data is designed to include items suitable for a specific environment unlike the OSD graphic data described with reference to FIG. 22, thereby preventing the screen from being unnecessarily hidden. In addition, the user does not need to manually select desired OSD graphic data or to separately select a specific device.

For example, the above-described strings correspond to "payment", "color key", "favorite channel", "trick play", "VOD (video on demand)", "numeral" or "number", but the present invention is not limited thereto. A detailed embodiment will be described with reference to FIG. 38.

FIG. 38 is a diagram showing another example of a database stored in the memory 3560 shown in FIG. 35. The detailed embodiment of the database shown in FIG. 37 will be described in greater detail with reference to FIG. 38.

If a string "number" is detected from the video image output by the multimedia device according to another embodiment of the present invention, first OSD graphic data shown on the right upper side of FIG. 38 is retrieved. The first OSD graphic data includes selectable options (e.g., numerals 0 to 9) necessary for the user in the current mode of the multimedia device.

If a color related string such as "red", "yellow" or "blue" is included in the video image output by the multimedia device, second OSD graphic data shown on the right middle side of FIG. 38 is retrieved. The second OSD graphic data includes selectable options (e.g., a color image having a button shape) necessary for the user in the current mode of the multimedia device.

If a string "VOD" is included in the video image output by the multimedia device, third OSD graphic data shown on the right lower side of FIG. 38 is retrieved. The third OSD graphic data includes selectable options (e.g., play, stop, pause, etc.) necessary for the user in the current mode of the multimedia device.

Figure 39:
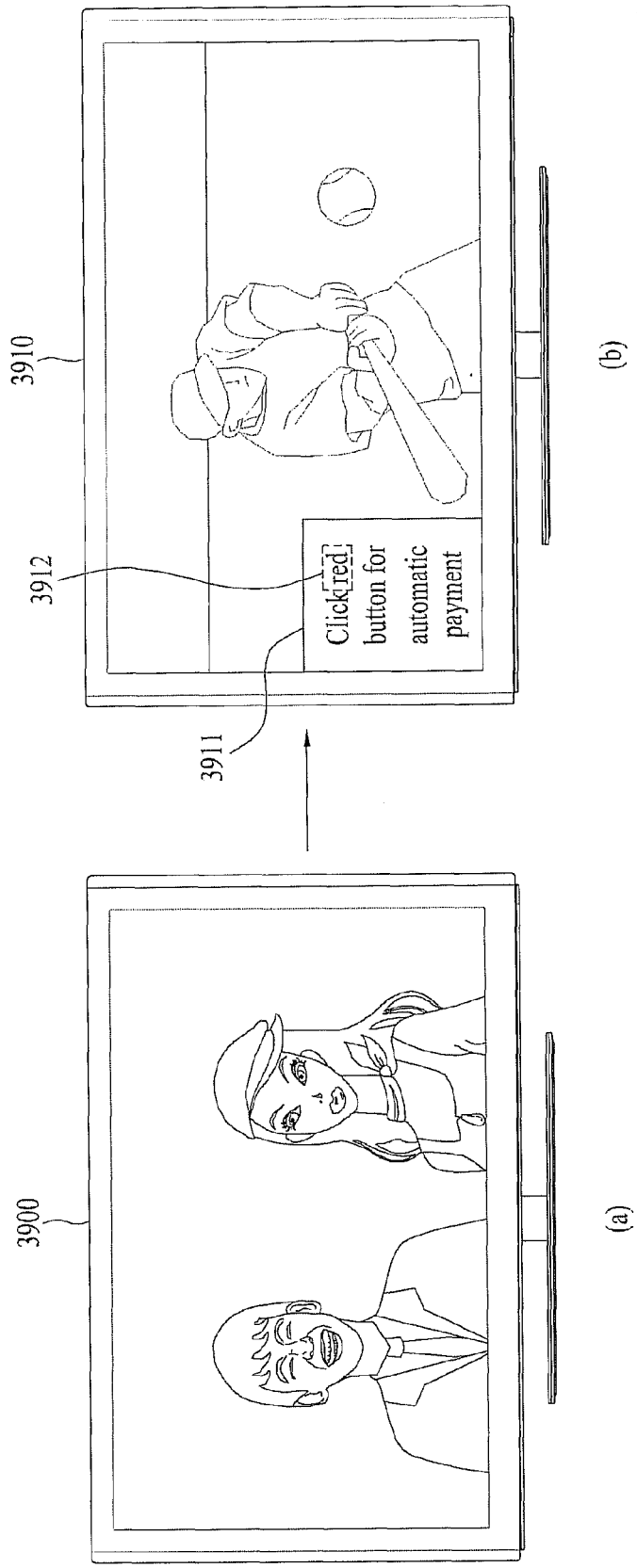
FIG. 39 is a diagram showing a process of recognizing an example of a specific string by a multimedia device according to another embodiment of the present invention.

FIG. 39 is a diagram showing a process of recognizing an example of a specific string by a multimedia device according to another embodiment of the present invention. Hereinafter, a process of recognizing a first string by a multimedia device for outputting a video image received from an external electronic device will be described with reference to FIG. 39.

As shown in FIG. 39(*a*), the multimedia device 3900 outputs the video image received from the external electronic device (e.g., an STB) on the screen.

At this time, as shown in FIG. 39(*b*), the multimedia device 3910 displays a popup message 3911 "click red button for automatic payment". Although a string is continuously detected according to one embodiment of the present invention, a string may be detected at a moment of output of the popup message 3911 according to another embodiment of the present invention.

As described above, the multimedia device 3910 is designed to detect only a specific string 3912 equal to or similar to a string stored in the database shown in FIG. 37 or 38 among the strings included in the popup message 3911. Accordingly, in a current situation, only an option for enabling a user to select a color key button is provided. The result value of recognition is output in the form of OSD graphic data shown in FIG. 40.

Figure 40:
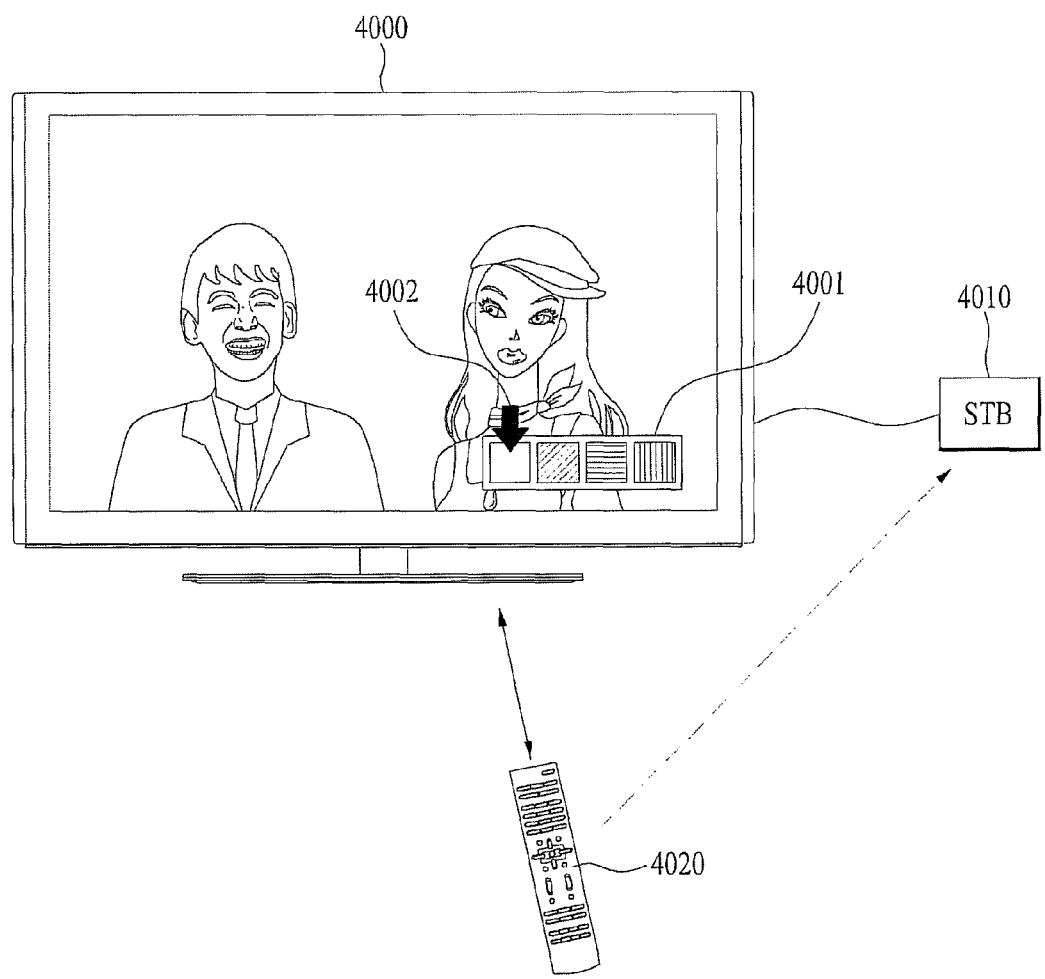
FIG. 40 is a diagram showing a data communication process among a multimedia device, a remote controller and an external electronic device based on the result of recognition illustrated in FIG. 39.

FIG. 40 is a diagram showing a data communication process among a multimedia device, a remote controller and an external electronic device based on the result of recognition illustrated in FIG. 39.

As described above with reference to FIG. 39, the multimedia device may automatically retrieve OSD graphic data currently necessary for a user. Accordingly, as shown in FIG. 40, the multimedia device 4000 according to another embodiment of the present invention outputs first OSD graphic data 4001 on the screen.

At this time, the user selects a desired specific region in the output first OSD graphic data 4001 using the remote controller 4020. For example, if an indicator 4002, the position of which is changed according to motion of the remote controller 4020, is positioned in the specific region (e.g., an image having a red button shape), the multimedia device 4000 transmits a code value corresponding thereto to the remote controller 4020 in an RF signal format.

The remote controller 4020 transmits the received code value to an STB 4010 which is an example of the external electronic device and automatically executes the function corresponding to the code value in the STB 4010.

Figure 41:
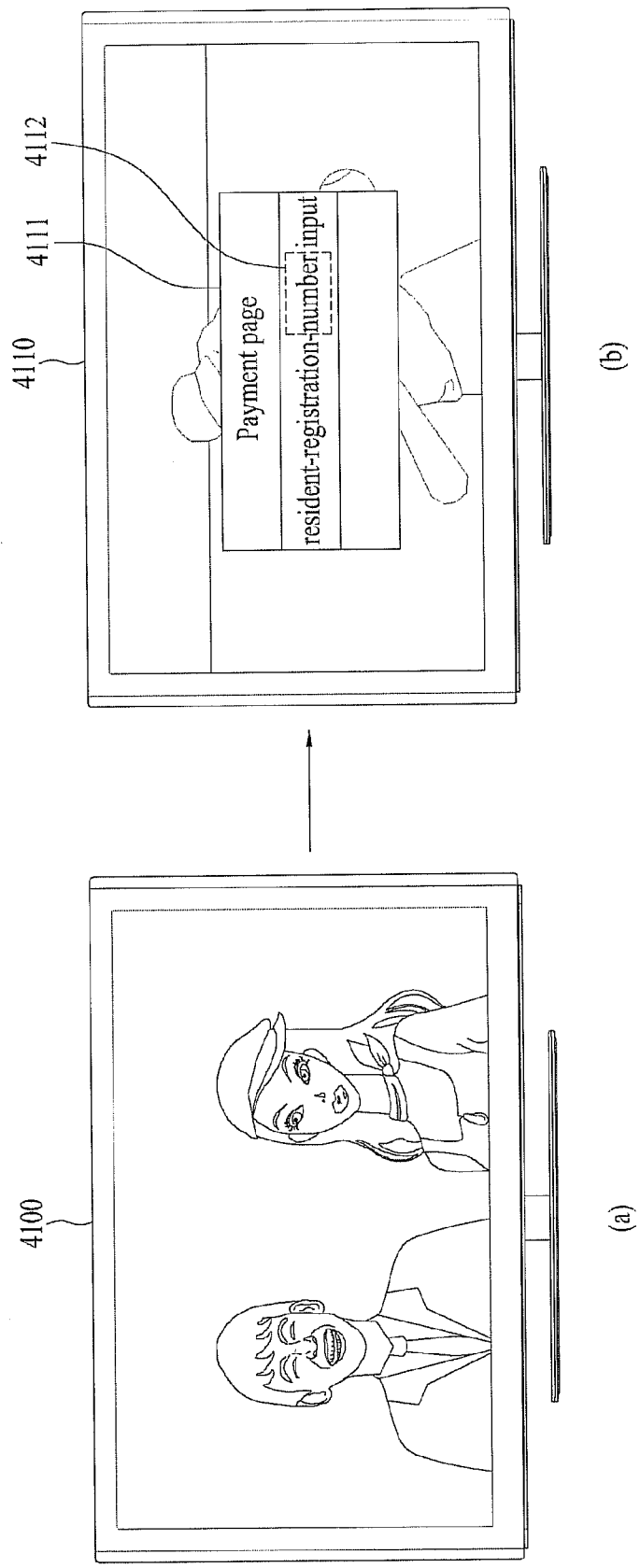
FIG. 41 is a diagram showing a process of recognizing another example of a specific string by a multimedia device according to another embodiment of the present invention.

FIG. 41 is a diagram showing a process of recognizing another example of a specific string by a multimedia device according to another embodiment of the present invention.

Hereinafter, the process of recognizing a second string by the multimedia device for outputting a video image received from an external electronic device will be described with reference to FIG. 41.

As shown in FIG. 41(a), the multimedia device 4100 outputs a video image received from an external electronic device (e.g., an STB) on the screen.

At this time, as shown in FIG. 41(b), the multimedia device 4110 displays a popup message 411 "payment page resident-registration-number input". Although a string is continuously detected according to one embodiment of the present invention, a string may be detected at a moment of output of the popup message 4111 according to another embodiment of the present invention.

Further, according to another embodiment of the present invention, a string detection process of a multimedia device is designed to be performed when specific information is received from a server while a specific mode is executed (e.g., VOD or automatic content recognition (ACR)).

ACR is performed by transmitting metadata of a movie or music, which is currently being output, to a server and, at a multimedia device, receiving information about a related movie or advertisement brand from a database of the server.

In this case, since additional commands such as use, access or payment of arbitrary content are involved, specific OSD retrieval according to string detection is necessary. In addition, by detecting characters only under a specific condition, it is possible to solve a problem in which a data processing speed is unnecessarily decreased. Of course, this is only exemplary and the scope of the present invention should be determined according to claims.

As described above, the multimedia device 4110 is designed to detect only a specific string 4112 equal to or similar to a string stored in the database shown in FIG. 37 or 38 among the strings included in the popup message 4111. Accordingly, in a current situation, only an option for enabling a user to select a numeric button is provided. The result value of recognition is output in the form of OSD graphic data shown in FIG. 42.

Figure 42:
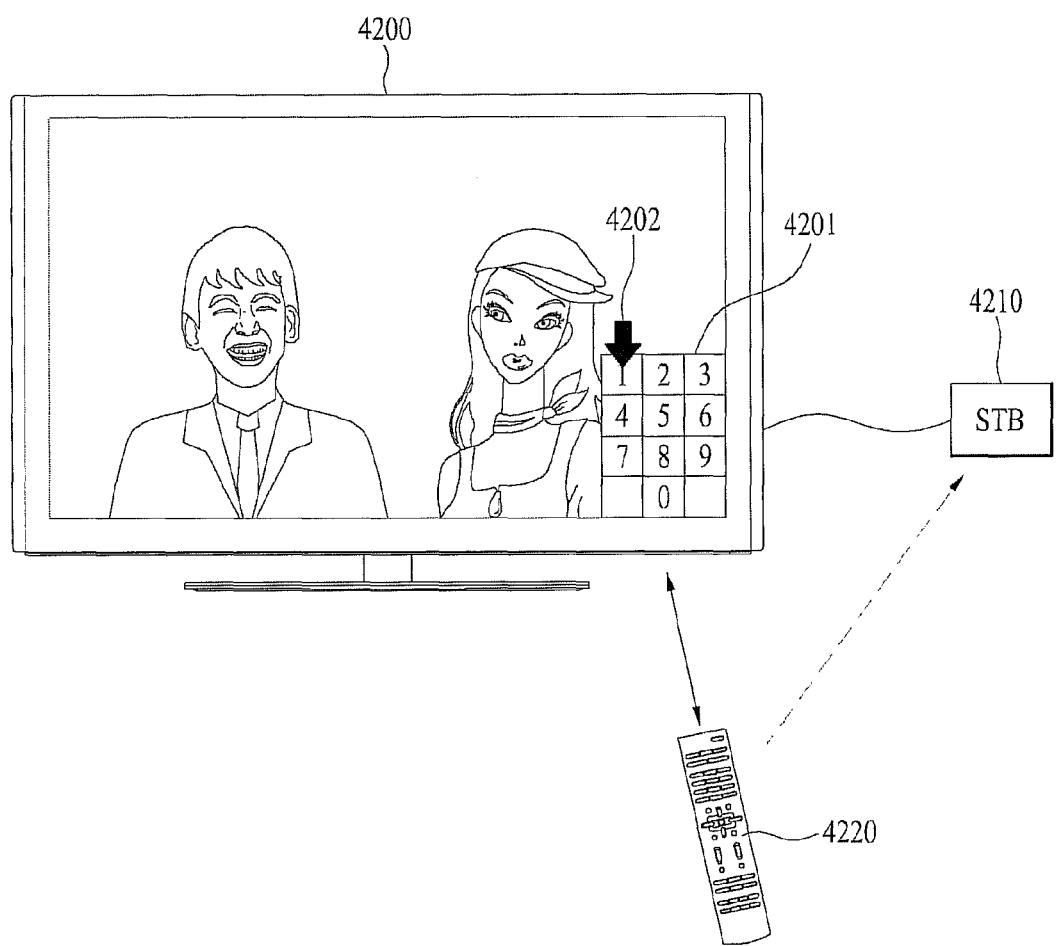
FIG. 42 is a diagram showing a data communication process among a multimedia device, a remote controller and an external electronic device based on the result of recognition illustrated in FIG. 41.

FIG. 42 is a diagram showing a data communication process among a multimedia device, a remote controller and an external electronic device based on the result of recognition illustrated in FIG. 41.

As described above with reference to FIG. 41, the multimedia device may automatically retrieve OSD graphic data currently necessary for a user. Accordingly, as shown in FIG. 42, the multimedia device 4200 according to another embodiment of the present invention outputs second OSD graphic data 4201 on the screen.

At this time, the user selects a desired specific region in the output second OSD graphic data 4201 using the remote controller 4220. For example, if an indicator 4202, the position of which is changed according to motion of the remote controller 4220, is positioned in the specific region (e.g., an image of a numeral 1), the multimedia device 4200 transmits a code value corresponding thereto to the remote controller 4020 in an RF signal format.

The remote controller 4220 transmits the received code value to an STB 4210 which is an example of the external electronic device and automatically executes the function corresponding to the code value in the STB 4210.

Figure 43:
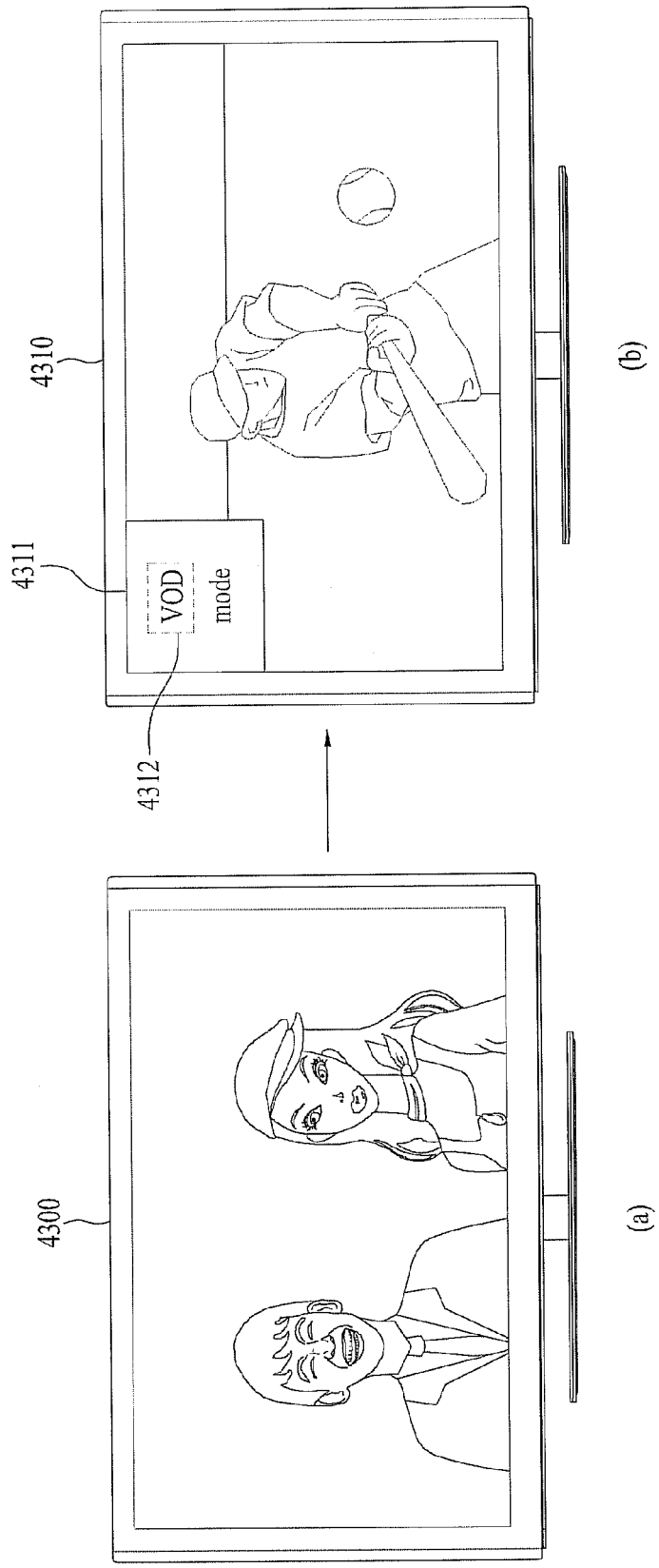
FIG. 43 is a diagram showing a process of recognizing another example of a specific string by a multimedia device according to another embodiment of the present invention.

FIG. 43 is a diagram showing a process of recognizing another example of a specific string by a multimedia device according to another embodiment of the present invention.

Similarly to the above description, the multimedia device 4300 outputs a video image received from an external electronic device (see FIG. 43(a)). As described with reference to FIGS. 39 to 42, the multimedia device 4310 according to another embodiment of the present invention is designed to detect only a specific string 4312 in the popup message 4311 (see FIG. 43(b)).

However, a multimedia device according to another embodiment of the present invention may be designed to retrieve corresponding OSD graphic data according to a current mode of the multimedia device, instead of a method of detecting a string.

That is, if the multimedia device enters a VOD mode, portions which will be provided to a user may include functions for controlling video content executed according to the VOD mode. For example, functions for controlling the video content, such as play, stop and pause, are immediately provided to the user. Accordingly, in addition to a database to which a specific string and OSD graphic data are mapped, which is described with reference to FIGS. 37 and 38, the multimedia device may map and store specific OSD graphic data according to a current mode, which falls within the scope of the present invention.

Figure 44:
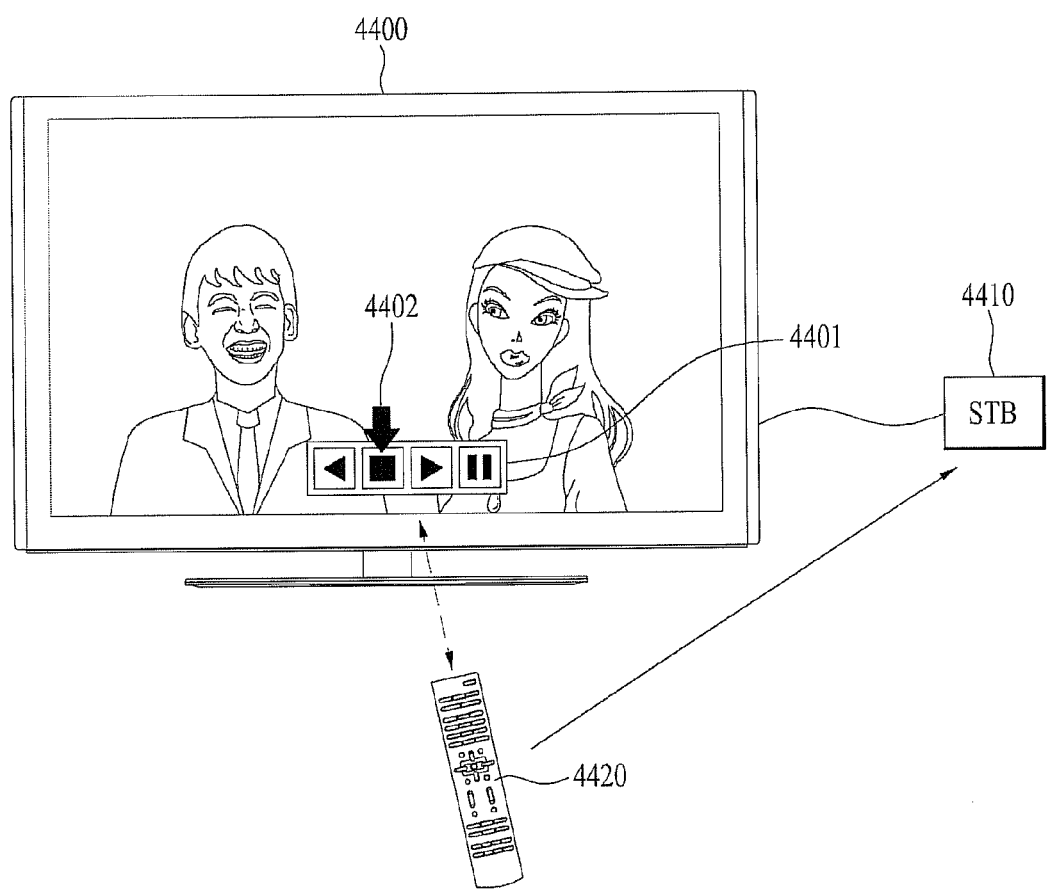
FIG. 44 is a diagram showing a data communication process among a multimedia device, a remote controller and an external electronic device based on the result of recognition illustrated in FIG. 43.

FIG. 44 is a diagram showing a data communication process among a multimedia device, a remote controller and an external electronic device based on the result of recognition illustrated in FIG. 43.

As described above with reference to FIG. 43, the multimedia device may automatically retrieve OSD graphic data currently necessary for a user based on at least one of a string recognition method or a current mode of the multimedia device. Accordingly, as shown in FIG. 44, the multimedia device 4400 according to another embodiment of the present invention outputs third OSD graphic data 4401 on the screen.

At this time, the user selects a desired specific region in the output third OSD graphic data 4401 using the remote controller 4420. For example, if an indicator 4402, the position of which is changed according to motion of the remote controller 4420, is positioned in the specific region (e.g., an image corresponding to a function for stopping video content), the multimedia device 4400 transmits a code value corresponding thereto to the remote controller 4420 in an RF signal format.

The remote controller 4420 transmits the received code value to an STB 4410 which is an example of the external electronic device and automatically executes the function corresponding to the code value in the STB 4410.

Figure 45:
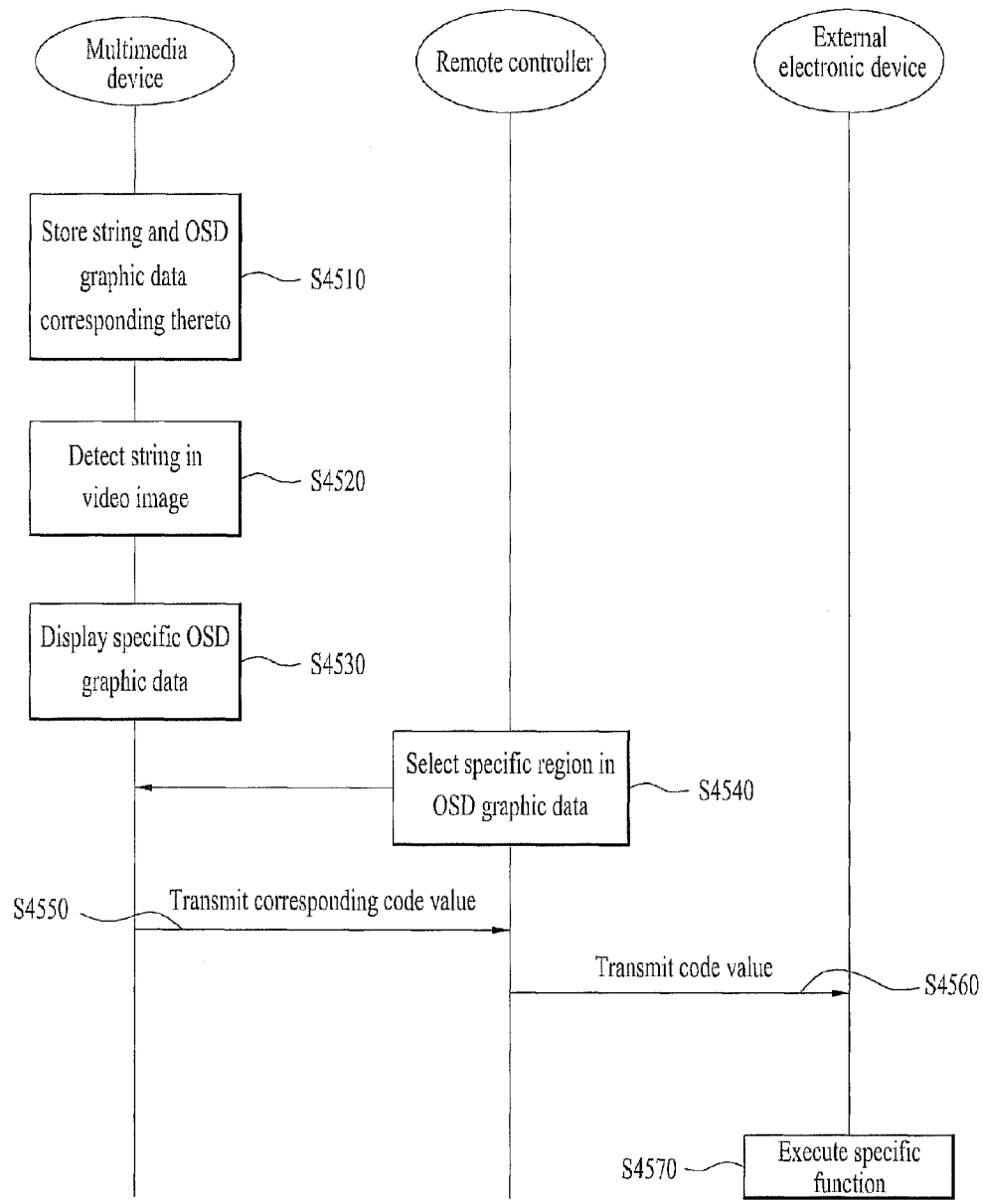
FIG. 45 is a flowchart illustrating a data communication process between components of an entire system including a multimedia device according to another embodiment of the present invention.

FIG. 45 is a flowchart illustrating a data communication process between components of an entire system including a multimedia device according to another embodiment of the present invention. FIG. 45 is shown to aid in understanding the embodiment of the present invention and the scope of the present invention is determined by claims. For example, the present invention may be implemented using only the multimedia device and the remote controller shown in FIG. 45.

The multimedia device stores at least one string and OSD graphic data corresponding thereto in a memory of the multimedia device (S4510).

The multimedia device detects a string in a video image output on the screen of the multimedia device (S4520).

The multimedia device displays OSD graphic data corresponding to the detected string on the screen (S4530). The OSD graphic data is divided into one or more regions, for example. The OSD graphic data 4001 of FIG. 40, the OSD graphic data 4201 of FIG. 42 and the OSD graphic data 4401 of FIG. 44 are divided into regions for displaying one or more functions for controlling the external electronic device.

The remote controller transmits a signal for selecting a specific region in the OSD graphic data to the multimedia device using a first communication method (S4540).

Accordingly, if the specific region in the OSD graphic data is selected using the remote controller, a code value corresponding to the specific region is transmitted from the multimedia device to the remote controller using the first communication method (S4550).

The code value is transmitted from the remote controller to the external electronic device using a second communication method (S4560). Accordingly, the external electronic device may automatically execute a specific function (S4570).

Step S4520 may be performed only when a first condition or a second condition is satisfied, which falls within the scope of the present invention.

The first condition, for example, corresponds to the case in which the video image includes a popup message and the second condition, for example, corresponds to the case in which the multimedia device executes a specific function.

Although not shown in FIG. 45, a step of, at the multimedia device, receiving the code value corresponding to each region in the OSD graphic data from the server may be further included.

The code value corresponds to a command for controlling the external electronic device, for example.

Further, step S4530 further includes a step of synthesizing the OSD graphic data and the video image and a step of outputting the OSD graphic data in a state of overlaying the video image.

The first communication method corresponds to, for example, a radio frequency (RF) communication protocol and the second communication method corresponds to, for example, an infrared (IR) communication protocol.

Figure 46:
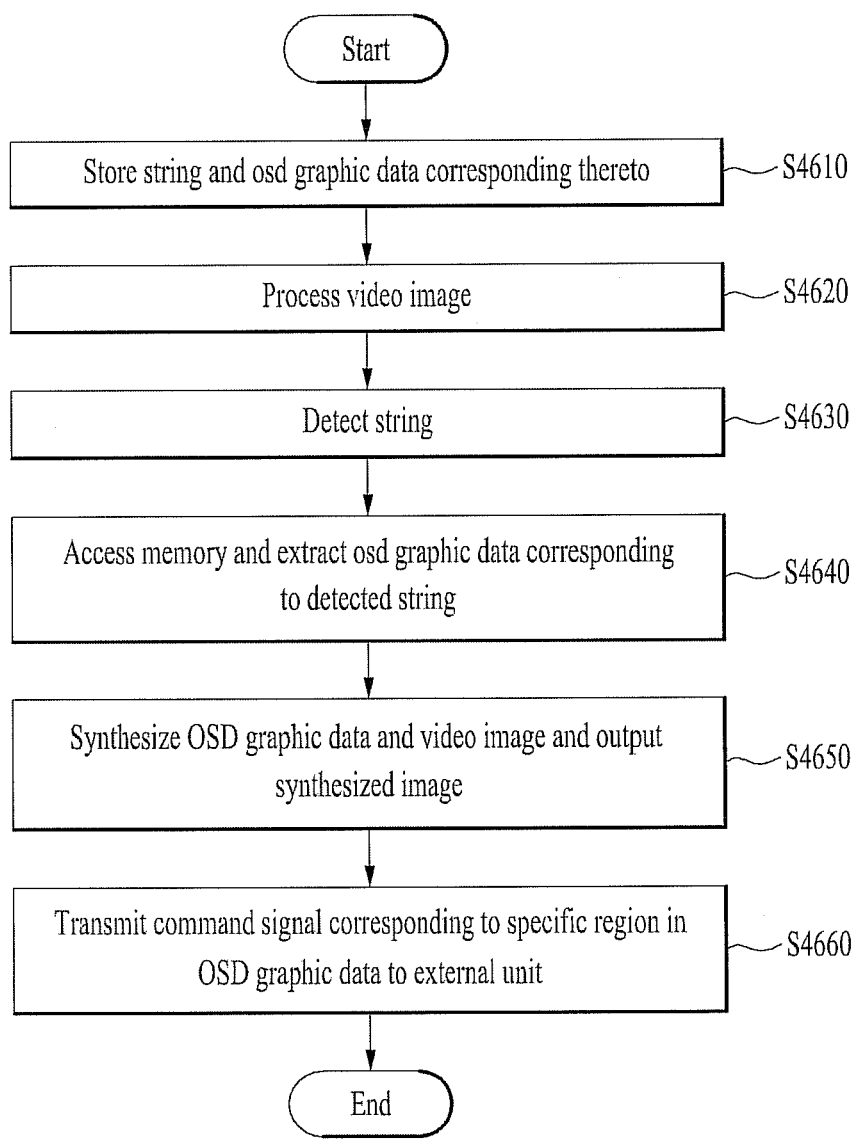
FIG. 46 is a flowchart illustrating a method for controlling a multimedia device according to another embodiment of the present invention.

FIG. 46 is a flowchart illustrating a method for controlling a multimedia device according to another embodiment of the present invention. Hereinafter, the operation of the multimedia device according to another embodiment of the present invention will be described in time series. Of course, as needed, some steps may be changed, deleted or added, which falls within the scope of the present invention.

The multimedia device connected to the external device stores one or more strings and OSD graphic data corresponding thereto in the memory (S4610).

The multimedia device processes the video image received from the external electronic device (S4620). The multimedia device is designed to detect a string from the video image (S4630).

The multimedia device accesses an internal memory and extracts OSD graphic data corresponding to the detected string (S4640).

The multimedia device synthesizes the extracted OSD graphic data and the video image and outputs the synthesized image (S4650). As described above, the OSD graphic data is divided into one or more regions.

The multimedia device is designed to transmit a command signal corresponding to the specific region to an external unit if the specific region in the OSD graphic data is selected (S466).

In step S4660, the command signal is transmitted to the external electronic device or the remote controller. Those skilled in the art may implement the present invention with reference to FIGS. 1 to 34.

As described with reference to FIGS. 1 to 46 (in particular, FIGS. 34 to 46), according to the embodiments of the present invention, the user does not need to directly select and retrieve OSD graphic data in order to execute a specific function.

Further, by outputting only functions currently necessary for the user in the form of a specific graphic image, it is possible to minimize a phenomenon in which an external video image is hidden by an OSD.

According to one embodiment of the present invention, it is possible to provide a solution for controlling different kinds of electronic devices while minimizing use of a memory of a remote controller.

According to another embodiment of the present invention, it is possible to improve a graphical user interface (GUI) of a multimedia device communicating with the remote controller. Therefore, it is possible to significantly increase a speed for controlling a plurality of devices.

According to another embodiment of the present invention it is possible to provide a solution related to a multimedia device for automatically generating and displaying OSD graphic data satisfying a specific condition so as to provide convenience to a user who is unfamiliar with use of a new hybrid remote controller.

The device and the method for controlling the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method comprising:
   storing, in a memory of a multimedia device, at least one string and on screen display (OSD) graphic data corresponding to the at least one string;
   displaying, on a screen, a video image received from an external electronic device;
   detecting a string in a video image displayed on the screen of the multimedia device;
   when the detected string is included in the at least one string stored in the memory, displaying, on the screen, the OSD graphic data corresponding to the detected string, the OSD graphic data being displayed as one or more regions;
   in response to a selection of a specific region of the displayed OSD graphic data, transmitting a code value corresponding to the specific region from the multimedia device to a remote controller using a first communication method; and
   transmitting, using a second communication method, the code value from the remote controller to the external electronic device.

2. The method according to claim 1, wherein the string includes a letter, a number, a color or an indicator having a specific shape.

3. The method according to claim 1, wherein displaying the OSD graphic data includes displaying selectable options of a current mode of the multimedia device.

4. The method according to claim 1, wherein detecting the string is performed when a popup message appears on the screen.

5. The method according to claim 1, wherein detecting the string is performed when the multimedia device performs a specific function.

6. The method according to claim 1, further comprising receiving, at the multimedia device, a code value, from a server, corresponding to each region of the OSD graphic data, wherein the code value corresponds to a command for controlling the electronic device.

7. The method according to claim 1, wherein displaying the OSD graphic data includes displaying the OSD graphic data and the video image such that the OSD graphic data appears to overlay the video image.

8. The method according to claim 1, wherein the first communication method corresponds to a radio frequency (RF) communication protocol, and the second communication method corresponds to an infrared (IR) communication protocol.

9. The method according to claim 1, wherein the multimedia device comprises a television, and the electronic device comprises one of a set top box, a digital versatile disc (DVD) player, a Bluray disc player or a computer.

10. The method according to claim 1, further comprising executing, in the electronic device, a function corresponding to the code value transmitted from the remote controller.

11. A multimedia device to communicate with an external electronic device, comprising:
   a memory configured to store at least one string and on screen display (OSD) graphic data corresponding to the at least one string;
   a video processor configured to process a video image;
   a display module configured to display, on a screen, a video image received from the external electronic device;
   a detection module configured to detect a string in the video image; and
   a communication module; and
   a controller configured to:
      access the memory and extract OSD graphic data corresponding to the detected string when the detected string is included in the at least one string stored in the memory,
      control the display module to display the extracted OSD graphic data the OSD graphic data being displayed as one or more regions, and
      in response to a selection of a region of the displayed OSD graphic data, control the communication module to transmit a code value corresponding to the selected region to a remote controller.

12. The multimedia device according to claim 11, wherein the string includes a letter, a number, a color or an indicator having a specific shape.

13. The multimedia device according to claim 11, wherein the display module displays selectable options of a current mode of the multimedia device.

14. The multimedia device according to claim 11, wherein the detection module includes an optical character recognition (OCR) tool to detect the string.

15. The multimedia device according to claim 11, further comprising a network interface configured to receive a code value, from a server, corresponding to each region of the OSD graphic data.

16. The multimedia device according to claim 11, wherein the multimedia device is a digital television (DTV), and the external electronic device is a set top box.

17. A method comprising:
   storing, in a memory of a multimedia device, at least one indicator and on screen display (OSD) graphic data corresponding to the at least one indicator;

detecting an indicator from a video displayed on the multimedia device;

providing on screen display (OSD) graphic data corresponding to the detected indicator when the detected indicator is included in the at least one indicator stored in the memory;

displaying the OSD graphic data and the video on the multimedia device, the OSD graphic data being displayed as a plurality of selectable regions;

receiving an input to select one of the plurality of selectable regions; and transmitting, from the multimedia device to a remote controller, a command corresponding to the selected region of the OSD graphic data.

18. The method according to claim 17, further comprising receiving, from the server, a code corresponding to at least the selected region of the OSD graphic data, wherein the code corresponds to a command for controlling an electronic device external to the multimedia device.

19. The method according to claim 17, wherein the indicator includes one of a letter, a number, a color or an indicator having a specific shape.

20. The method according to claim 17, further comprising transmitting a code from the remote controller to an electronic device external to the multimedia device or the remote controller.

21. The method according to claim 20, further comprising executing a function corresponding to the code transmitted from the remote controller.

22. The method according to claim 20, wherein the command is transmitted from the multimedia device using a radio frequency (RF) communication protocol, and the code is transmitted from the remote controller using an infrared (IR) communication protocol.

23. A computer-readable recording medium having a program recorded thereon for executing the method according to claim 17.

* * * * *